(12) United States Patent
Tietzen et al.

(10) Patent No.: US 11,138,627 B2
(45) Date of Patent: *Oct. 5, 2021

(54) CLIENT ACQUISITION AND SURVEYING

(71) Applicant: EDATANETWORKS INC., Edmonton (CA)

(72) Inventors: Terrance Patrick Tietzen, Edmonton (CA); Ronald James Mackay, Edmonton (CA); Timothy Majoto Yamamoto, Edmonton (CA)

(73) Assignee: EDATANETWORKS INC., Edmonton (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/713,390

(22) Filed: Dec. 13, 2019

(65) Prior Publication Data
US 2020/0226633 A1 Jul. 16, 2020

(51) Int. Cl.
G06Q 30/02 (2012.01)

(52) U.S. Cl.
CPC ......... *G06Q 30/0226* (2013.01); *G06Q 30/02* (2013.01); *G06Q 30/0217* (2013.01); *G06Q 30/0227* (2013.01)

(58) Field of Classification Search
CPC .... G06Q 30/00; G06Q 30/02; G06Q 30/0207; G06Q 30/0226

(Continued)

(56) References Cited

U.S. PATENT DOCUMENTS

| 2006/0074753 | A1* | 4/2006 | Schuh | G07F 17/3255 |
| | | | | 705/14.23 |
| 2006/0253320 | A1* | 11/2006 | Heywood | G06Q 30/02 |
| | | | | 705/14.18 |

(Continued)

FOREIGN PATENT DOCUMENTS

WO    WO 2005/048054 A2 *  5/2005

OTHER PUBLICATIONS

Yuheng Cao; Nsakanda, A.L.; Diaby, M.; Shaobo Ji; Hine, M.J., Exploring Contracts with Options in Loyalty Reward Programs Supply Chain (English), 2012 45th Hawaii International Conference on System Sciences (pp. 1257-1266), Jan. 1, 2012 (Year: 2012).*

*Primary Examiner* — Marilyn G Macasiano
(74) *Attorney, Agent, or Firm* — DeSandro Law Group PLLC; Bradley K. DeSandro

(57) ABSTRACT

A method, system and computer program for enabling a loyalty system to be linked to one or more card issuers, cardholders, merchants, and thereby their cardholders. A system operable to create, implement and manage one or more loyalty programs that provide benefits to members of the loyalty programs in connection with transactions between the members and one or more merchants associated with the loyalty system. The method includes registering on the loyalty system one or more card issuers; one or more merchant acquirers associated with the one or more card issuers; a plurality of cardholders as members of the loyalty program. Establishing and applying rules for accrual and processing of benefits from the merchants to cardholders (Continued)

associated with the one or more card issuers in connection with transactions between the cardholders and the merchants with the loyalty system. Defining a rule based survey utility operable to issue surveys to members of the loyalty system on a transaction and non-transaction basis.

20 Claims, 22 Drawing Sheets

(58) Field of Classification Search
USPC .............................. 705/14.27, 14.31, 14.38
See application file for complete search history.

(56) References Cited

U.S. PATENT DOCUMENTS

| | | | | |
|---|---|---|---|---|
| 2009/0248506 | A1* | 10/2009 | Goldstein | G06Q 30/0226 705/14.27 |
| 2009/0307060 | A1* | 12/2009 | Merz | G06Q 30/02 705/14.27 |
| 2010/0145786 | A1* | 6/2010 | Fordyce, III | G06Q 30/0226 705/14.27 |

* cited by examiner

Joe's Sporting Goods Store

Questions must relate to customers experience with this merchant

1) How would you rate our product selection?  Y N
2) How would you rate this service?  1 2 3 4 5
3) Comments?
4) Can we contact you for additional offers and specials?  Y N

Melvin's Athletic Shoe Manufacturing

Questions must relate to customers experience with the corporate sponsors area of expertise
OR
They must clear the questions with the Administrator 1) Have you purchased our shoes before?  Y N
2) How would you rate our product?  1 2 3 4 5
3) Comments?
4) Can we contact you for additional information?  Y N

Bank of Alba

Questions must relate to customers experience with the Financial institutions area of expertise 1) How would you rate our service?  Y N
2) How would you rate our credit card?  1 2 3 4 5
3) Comments?
4) Can we contact you for additional offers and specials?  Y N

Administrator Questions

1) Did the loyalty system influence your visit?  Y N
2) Was this your first visit?  1 2 3 4 5
3) Are you interested in earning prize entries for additional surveys?  Y N

Figure 12

Your Feedback Page

Please let our merchants, corporate sponsors and financial institutions know how you feel about them.

| | | |
|---|---|---|
| Merchant "A" | Merchant "B" | Merchant "C" |
| Corporate Sponsor "A" | Corporate Sponsor "B" | Corporate Sponsor "C" |
| Manufacturer "A" | Manufacturer "B" | Manufacturer "C" |
| Financial Institution "A" | Financial Institution "B" | Financial Institution "C" |

Figure 14

CLIENT ACQUISITION AND SURVEYING

REFERENCE TO RELATED APPLICATIONS

This utility patent application is a continuation of, and claims priority to, U.S. patent application Ser. No. 14/071,062, filed on Nov. 4, 2013, titled "Method, System And Computer Program For Client Acquisition And Surveying", now U.S. Pat. No. 10,540,675, issued on Jan. 21, 2020 which is a continuation of U.S. patent application Ser. No. 12/663,533 filed Dec. 8, 2009, titled "Method, System And Computer Program For Client Acquisition And Surveying", now U.S. Pat. No. 8,577,722, issued on Nov. 5, 2013, which is a national stage of PCT/CA2008/001103 filed Jun. 6, 2008, which claims priority from Canadian Patent Application No. 2,591,175 filed on Jun. 8, 2007, each of which are incorporated by reference in their entireties.

FIELD

This invention relates to creation and administration of loyalty reward programs. This invention relates more particularly to creation and administration of loyalty reward programs involving a plurality of merchants and loyalty program members, including members holding financial cards from a card issuer associated with the loyalty reward program.

BACKGROUND

It should be understood that in this disclosure the term "merchant" refers to an entity who participates in a loyalty program to build loyalty with customers, and potentially acquire new business, and in exchange is willing to provide a loyalty "benefit" (meaning in this disclosure the various type of benefits that may be associated with loyalty cards including points, whether convertible to financial rewards, or financial rewards convertible to points, cash, products, services, discounts, value add-ons for purchases of products or services, the opportunity to enter into a contest with prizes contributed by the merchants, financial institutions and/or the loyalty system operator). A "member" refers to the customer or potential customer who is a member of the referred to loyalty program. A "card issuer" refers to an entity that issues (directly or through an agent) financial cards to individuals or businesses. The card issuer is generally a financial institution, financial institution in association with a credit card company, or other entity that has a financial institution arm. A "corporate sponsor" refers to a corporation wishing to develop and build product goodwill by sponsoring the loyalty system. "Financial cards" generally refer to credit cards, debit cards, INTERAC™ cards, stored value cards and so on. "Cardholders" refer to the individuals or businesses to whom the financial cards are issued. It should also be understood that "loyalty" is used in the broad sense to also extend to "rewards", therefore a "loyalty program" should be understood to also extend to a "reward program".

Numerous customer loyalty and customer acquisition programs are known. Customer acquisition systems also play an increasingly important role for business. Customer loyalty programs can contribute to the loyalty of existing customers, but also can play a role in acquiring new customers. One of the challenges in deploying customer loyalty programs is finding efficient ways to attract new members to the loyalty program.

There are many card issuers in the marketplace. The businesses of the various card issuers can vary significantly. Financial cards are generally issued by or issued in cooperation with financial institutions. For example: (1) financial institutions (including a financial institution associated with a source of benefits) issue financial cards directly to customers; and (2) a co-branded financial card including for example the brand of the financial institution and the brand of a source of benefits.

Financial institutions are often interested in partnering with ether entities, such as sources of benefits, to make the benefits associated with their financial card competitive. This is in order to retain and attract their customers, but also in order to compete for transaction share as cardholders generally carry more than one financial card in their wallet. Transaction share in turn affects the revenue realized by the financial institution (as particularized herein). Accordingly, financial institutions tend to measure the effectiveness of their marketing efforts in connection with financial cards by analyzing incremental transactions involving their financial card.

In addition, financial institutions are generally interested in sharing profit/risk with other parties in connection with their financial card related activities. This is evidenced in the popularity of co-branded cards. Generally speaking, however, card issuers are only interested in providing access to their customer base to outside parties if there is significant financial reward, and if this access does not conflict with their own interests and/or present any risk to the customer base.

Merchants provide benefits to their customers for reasons that are not dissimilar to the factors that motivate financial institutions. Merchants are interested in attracting and maintaining customers. The cost of acquisition of a new customer for many merchants is quite high. While merchants are interested in acquiring new customers efficiently, they are often also willing to provide relatively significant benefits in exchange for a new customer relationship from an outside source.

Merchants and financial institutions often collaborate in the context of co-branded financial cards. Examples include airline/credit cards, oil company financial cards, or retail chain financial cards. From a merchant perspective, these collaborative arrangements are generally available to large national chains and are not generally available to regional chains, even though from a customer acquisition or benefits perspective such regional chains might be of interest to a financial institution. The costs associated with deploying and marketing a co-branded card require economies of scale that effectively exclude many regional co-branded financial card arrangements. From the perspective of a financial institution, the benefits associated with the co-branded financial cards are generally limited to the type of benefits made available by the one merchant or a relatively small group of associated partners. This exposes the financial institution to competition to other co-branded financial cards, especially if the merchant associated with the competing card is more popular or provides more attractive benefits. Also, relationships with merchants become difficult or cumbersome to replace (especially over time) thereby resulting in loss of bargaining power in the hands of the financial institution and thereby possible erosion of benefits. This contributes risk to the financial institution's card issuing operation, and also generally results in financial institutions entering into multiple co-branding relationships, which in turn adds to the associated costs.

There is a need for a loyalty program that enables multiple merchants to reflect their changing business objectives by dynamically modifying the rules of the loyalty program as they relate to benefits accrued by cardholders. There is a further need for a loyalty program that enables merchants to customize their loyalty program, including as it related to cardholders who become members of the loyalty program, on the fly, including based on effectiveness and incremental cost. To better achieve these goals and to better understand the needs of the loyalty program member, informational feedback is required. Therefore, there is a need for a loyalty program that allows for customized surveys generated for loyalty program members as created by merchants, sponsors, manufacturers, and financial institutions.

Co-Pending Canadian Application No. 2,468,386, filed on May 27, 2004, describes a "Method, System, and Computer Program for Providing a Loyalty Engine Enabling Dynamic Administration of Cross-Promotional Loyalty Programs (the "Co-Pending Patent Application"). The Co-Pending Patent Application generally describes a system, method and computer programs that permits dynamic interactions between a plurality of merchants and a plurality of members. The particular solution described in the Co-Pending Patent Application enables the merchants to dynamically customize loyalty programs based on effectiveness and incremental cost. There is a particular need for a method, system and computer program that enables the efficient creation and management of a relationship between merchants and card issuers in the context of a loyalty program for mutual benefit.

Co-Pending Canadian Application No. 2,550,067 filed on Jun. 9, 2006 describes a loyalty program wherein further benefits and means to acquire and retain members may be associated with loyalty cards including points, whether convertible to financial rewards, or financial rewards convertible to points, cash, products, services, discounts, value add-ons for purchases of products or services, the opportunity to enter into a contest with prizes contributed by the merchants, financial institutions and/or the loyalty system operator.

SUMMARY OF INVENTION

An aspect of the present of the invention is a method for enabling a loyalty program to be linked to one or more card issuers, and thereby their cardholders, by operation of a loyalty system, the loyalty system being operable to enable the creation, implementation and management of one or more loyalty programs that provide benefits to members of the loyalty programs in connection with transactions between the members and one or more merchants associated with the loyalty system, the method comprising the steps of: registering on the loyalty system one or more card issuers; registering on the loyalty system one or more merchant acquirers associated with the one or more care issuers; registering a plurality of the cardholders as members of the loyalty program; the operator of the loyalty system, the one or more card issuers, and the merchants establishing the rules for accrual and processing of benefits from the merchants to cardholders associated with the one or more card issuers in connection with transaction between the cardholders and the merchants with the loyalty system; applying the rules to accrue and process the benefits of cardholders in connection with the transactions between the cardholders and the merchants, by operation of the loyalty system; and defining a survey utility function capable to issue surveys to members of the loyalty system.

A further aspect of the present invention involves a method enabling a loyalty program to provide a survey utility function that allows participating groups, including merchants, sponsors/manufacturers and financial institutions to prepare questions that may be posed to a member wherein the questions are compiled into a survey and the survey utility function further comprising: maintaining a database of members' answers to the survey questions for future retrieval wherein the answers are recorded in association with the member who gave the answer; and compiling reports for the merchants, sponsors/manufacturers and financial institutions based on their particular survey questions and the survey responses received by the members.

BRIEF DESCRIPTION OF THE DRAWINGS

A detailed description of the preferred embodiment(s) is (are) provided herein below by way of example only and with reference to the following drawings, in which:

FIG. 12 illustrates an example of a transaction based survey.

FIG. 14 illustrates the member feedback page.

Figure 1:
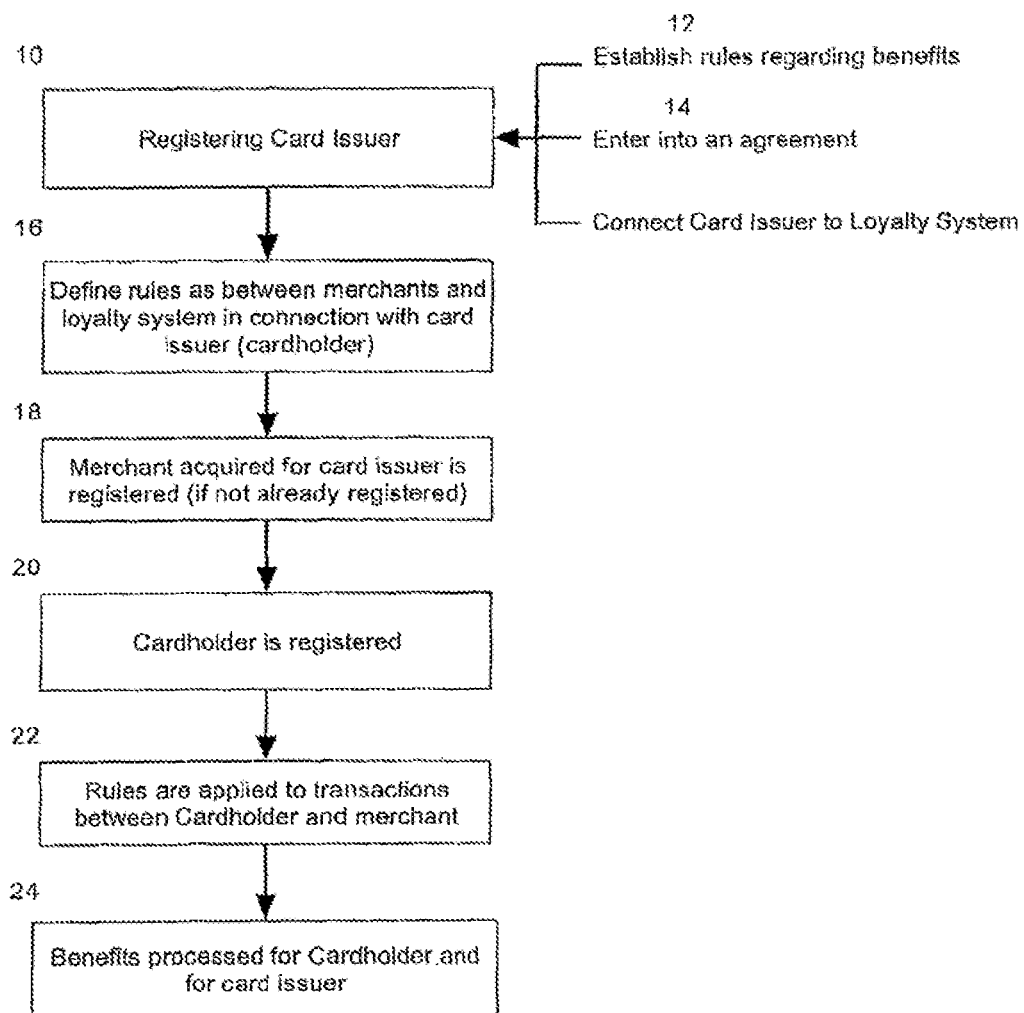
FIG. 1 is a flowchart summarizing the overall method of the present invention.

In the drawings, preferred embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

FIG. 1 illustrates the general method of the present invention. A method is illustrated that enables a loyalty program to be linked to one or more card issuers, and thereby to their cardholders, by operation of a loyalty program platform or loyalty engine or loyalty system. The method includes registering on the loyalty system one or more card issuers (10). The loyalty system of the present invention already provides to a plurality of merchants associated with the loyalty system a plurality of tools to customize one or more loyalty programs made available to members of the loyalty program platform (customers and potential customers of the merchants). As illustrated in FIG. 1, the operator of the loyalty program platform establishes the rules regarding the accrual of benefits from merchants to the card issuers and/or cardholders (12), and establishes a contractual relationship with the one or more card issuers (14), such contracts incorporating the rules applicable within the loyalty system in connection with the card issuers (as well as their cardholders). These rules include, for example, the term of the agreement, accrual periods, geographic area of operation (if applicable) and most importantly the particulars of the benefits (including per transaction benefits, convertibility of benefits, accrual periods, timing of obligation regarding realization of benefits etc. as particularized below) accrued to cardholders and/or card issuers.

These rules are reinforced in the arrangements entered into between the operator of the loyalty system and the various merchants so as to define the terms under which benefits will be made available to cardholders and/or card issuers.

In accordance with a particular embodiment of the present invention, the operator of the loyalty system establishes independently the rules under which the merchant shall accrue benefits for cardholders and/or card issuers, generally independently of card issuer but in conformity with the arrangements entered between the operator of the loyalty system and the card issuer (16). One of the advantages of the present invention is that the operator of the loyalty system manages the aforesaid relationships, and provides access to a technology infrastructure that enables card issuers and merchants to focus on using the tools of the loyalty system to enhance their business, rather than spending extensive resources on administrative issues.

Typically, the merchants agree to conform to commitments that they make to members that are displayed in a benefits area of a website associated with the members who are cardholders, and linked to the loyalty system. These commitments are generally made by merchants in connection with the customization of their loyalty programs by operation of the loyalty engine described in the Co-Pending Patent Application.

The merchant acquirer is also registered on the loyalty system (18), if the merchant acquirer is not already registered. The cardholders are registered as members on the loyalty system (20). This occurs in part as a result of promotion of the loyalty system to the cardholders by the card issuer, as explained below. It is important to understand that, in addition to the card issuer, in most cases there is also a "merchant acquirer", who is an entity that contracts with a merchant to process financial card transaction information, and that receives unique data not received by the card issuer.

As a further aspect of the method of the present invention, the loyalty system applies the aforementioned rules as they apply to each cardholder who is a member so as to process the applicable benefits based on applicable transactions entered into by the cardholder that are linked to the loyalty system, i.e. a qualifying transaction between a cardholder and a merchant, as determined by the aforesaid rules (22). By application of such rules, the loyalty system processes the agreed to benefits for the cardholder and/or the card issuer (24).

Figure 2A:
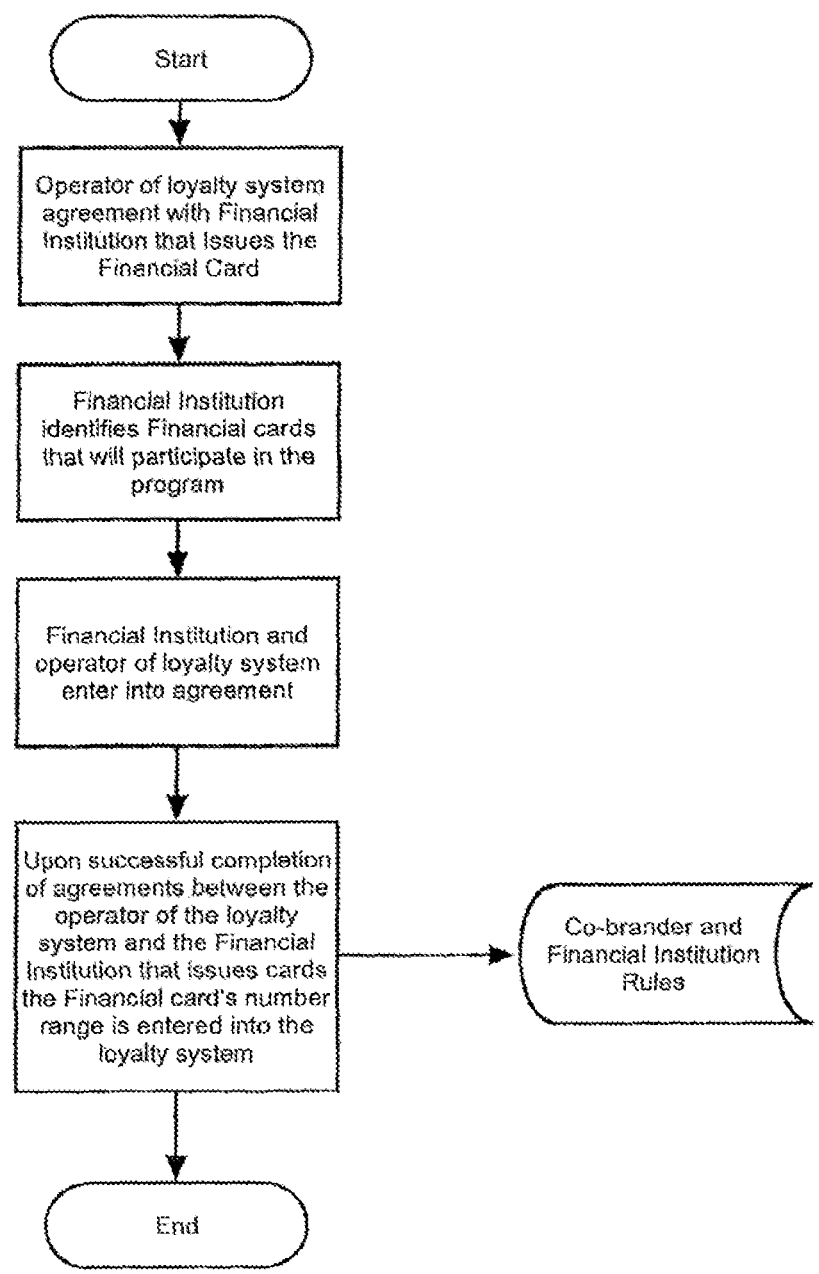
FIG. 2a illustrates a particular embodiment of the method of the present invention, according to which a card issuer is registered to the loyalty system of the present invention.
Figure 2B:
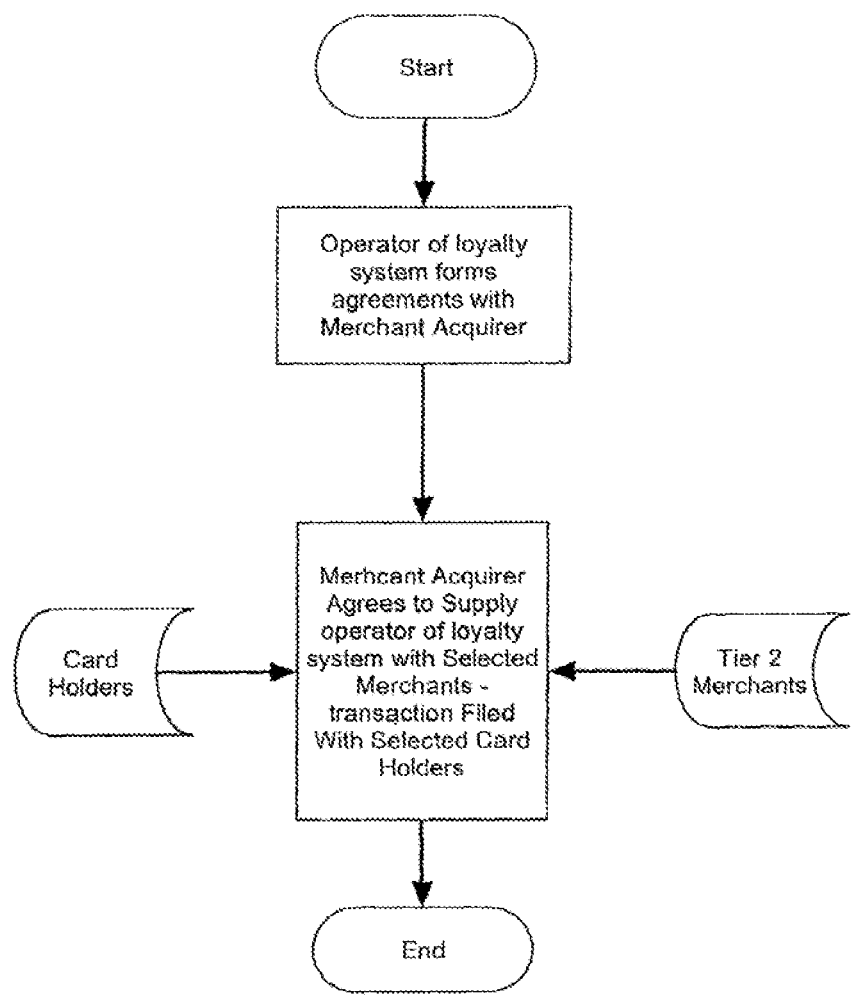
FIG. 2b illustrates a particular embodiment of the method of the present invention, according to which a merchant acquirer is registered to the loyalty system of the present invention.
Figure 2C:
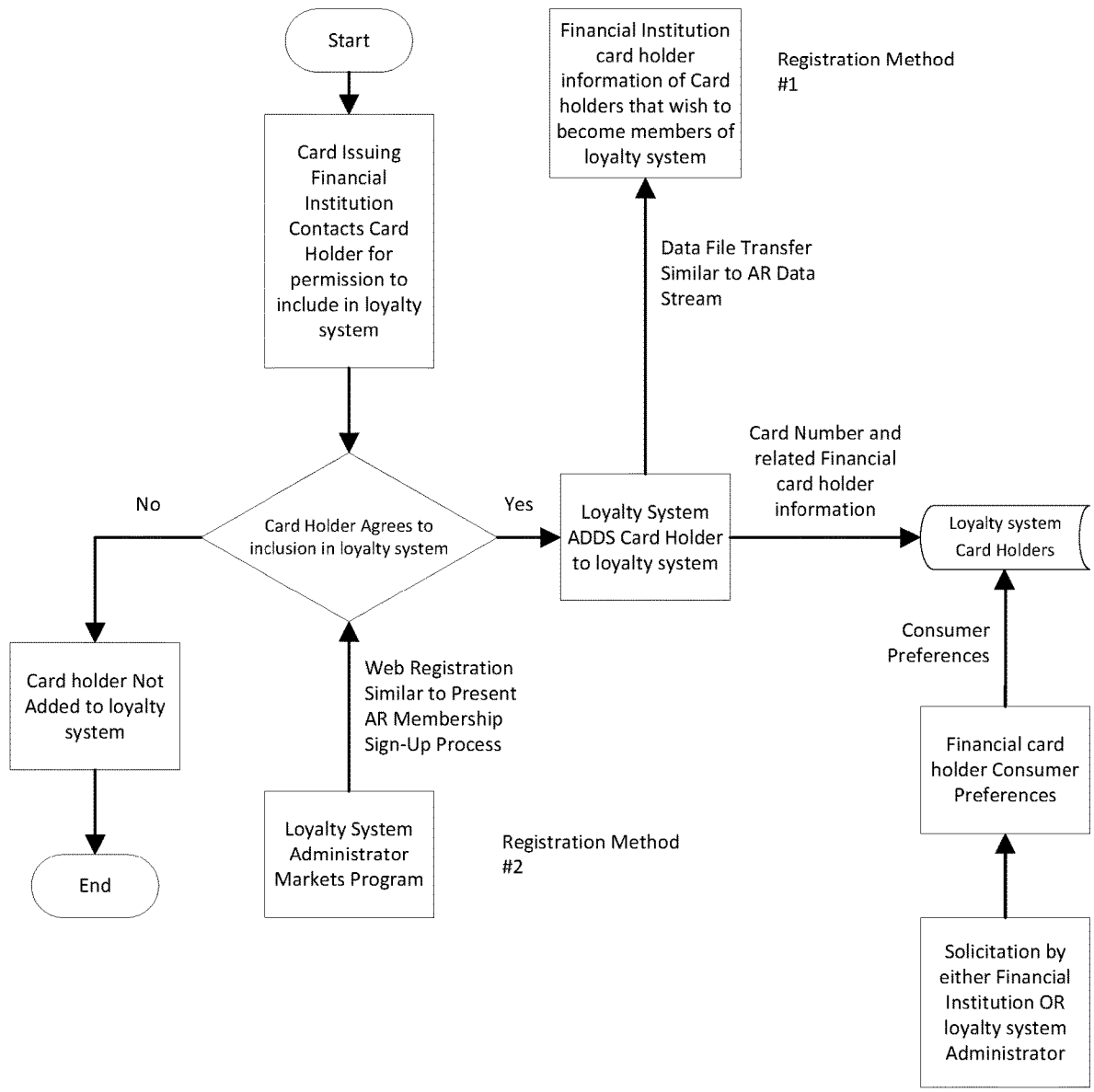
FIG. 2c illustrates a particular embodiment of the method of the present invention, according to which a cardholder is registered to the loyalty system of the present invention, thereby becoming a member.
Figure 2D:
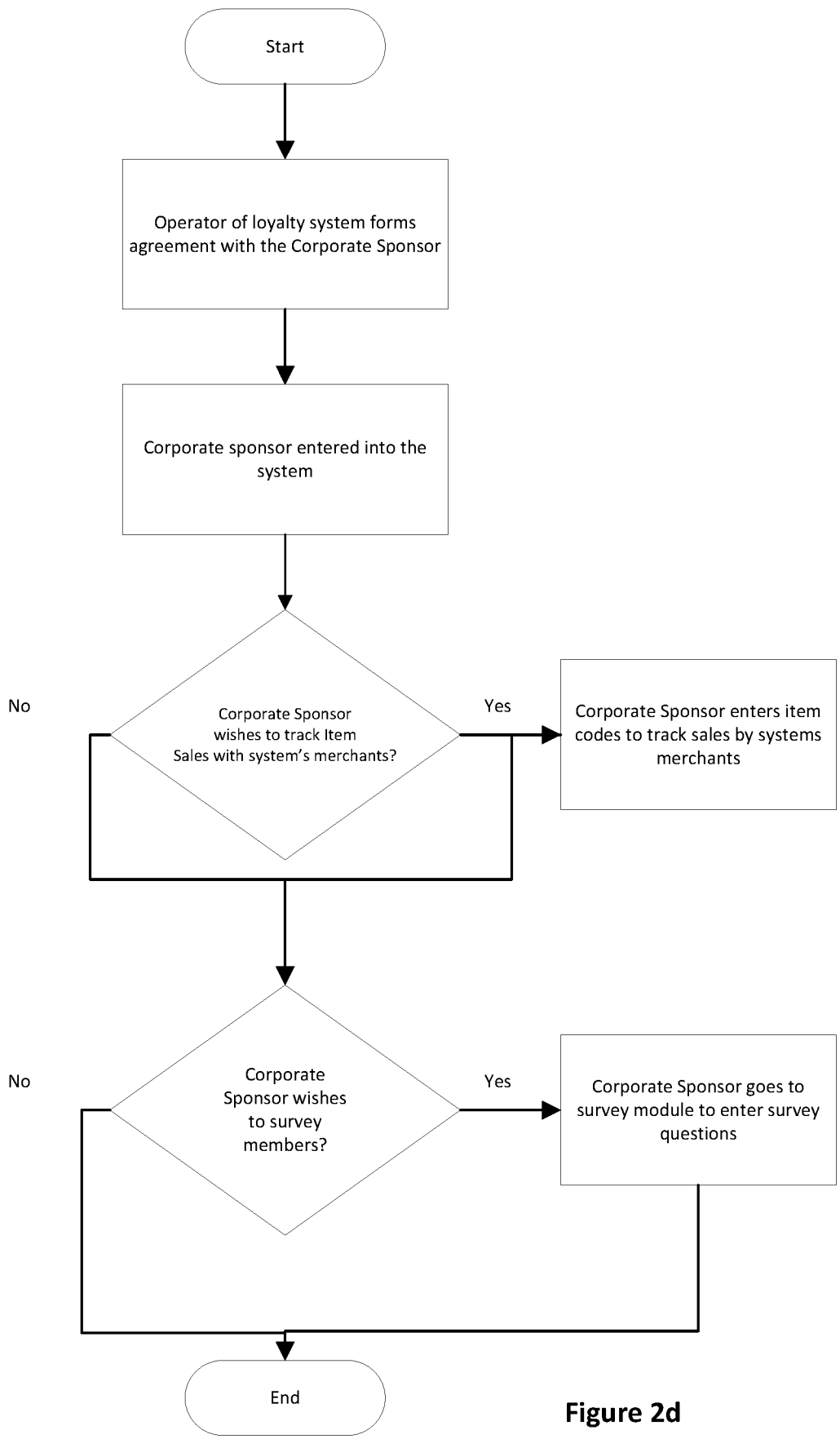
FIG. 2d illustrates a particular embodiment of the present invention, according to which a corporate sponsor is registered to the loyalty system of the present invention with the option to survey members on a transactional or non-transactional basis.

FIG. 2a illustrates in greater detail the particular aspect of the present invention according to which a card issuer is registered to the loyalty system. FIG. 2b illustrates a particular embodiment of the method of the present invention, according to which a merchant acquirer is registered to the loyalty system of the present invention. The role of the merchant acquirer is explained in greater details below. FIG. 2c illustrates in greater detail a particular embodiment of the present invention according to which a cardholder is registered to the loyalty system of the present invention, thereby becoming a member. FIG. 2d illustrates in greater detail a particular embodiment of the present invention, according to which a corporate sponsor is registered to the loyalty system of the present invention. The corporate sponsor is then provided the opportunity to prepare survey questions which could later be posed to the cardholder on a transactional or non-transactional basis.

Figure 3:
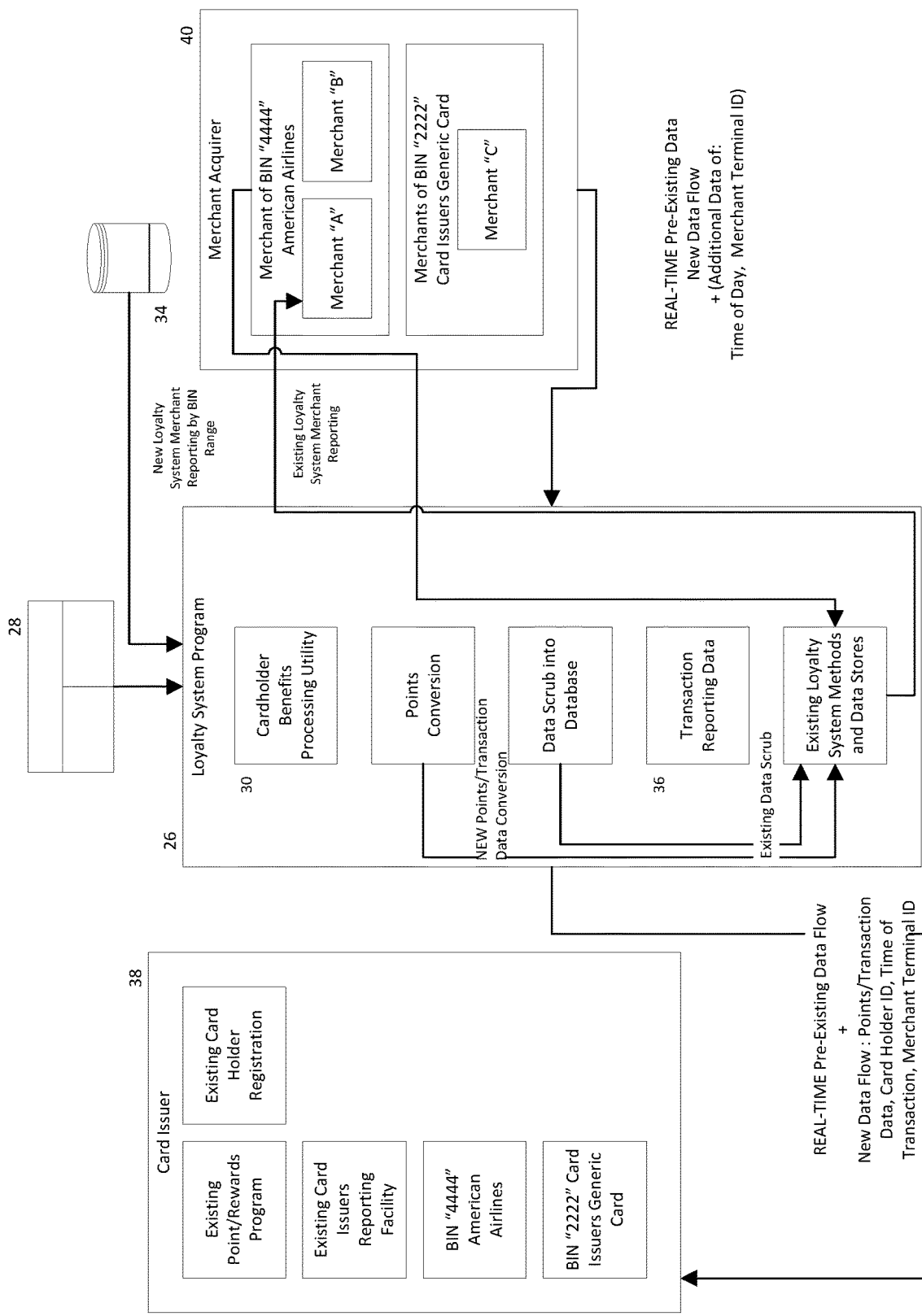
FIG. 3 is a system flowchart illustrating the resources of the system of the present invention, in one embodiment thereof.

FIG. 3 best illustrates the system of the present invention, in one particular embodiment thereof. The system is best understood as an extension of the functionality described in the Co-Pending Patent Application and therefore including generally a loyalty system (26), implemented on a server computer (28). The loyalty system (26) includes a cardholder benefits processing utility (30) of the present invention. The server computer (28) is preferably connected to the Internet. In one example of an implementation of the cardholder benefits processing utility (30), it is best understood as a software component of a web utility that provides the loyalty engine (30) particularized in the Co-Pending Patent Application. The cardholder benefits processing utility (30) is programmed in a manner that is known to those skilled in the art, and is operable to provide on the database (32) the benefits accounts (34) of the various cardholders who are members. Access to different aspects of the database (32) is provided by a known administration utility (not shown) that enables hierarchical access to the database (32), depending on permissions assigned by the operator of the loyalty system, to each of members, merchants, card issuers and merchant acquirers. The purpose of providing this access is to provide transparency to the benefits being provided to members who are cardholders by operation of the loyalty system, as particularized below. A reporting utility or transaction data reporting (36) is further linked to the cardholder benefits processing utility (30) to provide various reports of interest to merchants, merchant acquirers, card issuers and cardholders in particular, for example, by permitting merchants, merchant acquirers and card issuers to generate reports on measured performance of benefits provided to them by the loyalty system in their sphere of interest (as particularized below). One of the purposes of the reporting utility (36) is to enable the organizations linked to the loyalty system to calibrate their involvement (e.g. by merchants or card issuers calibrating the benefits that they provide) targeted to cardholders, as described in the Co-Pending Patent Application.

It should be understood that in one particular embodiment of the present invention, card issuers are also provided with the tools described in the Co-Pending Patent Application to design and implement their own loyalty programs, including cross-promotional programs in conjunction with merchants.

The system of the present invention is operable with any financial card that permits tracking of transaction information through the known card processing systems. Financial cards such as credit cards, debit cards, INTERAC™ cards, stored value cards, are designated by a BIN number range. The BIN range identifies the financial card type and the issuing financial institution. Card issuers typically market card types to certain segments of the population based upon demographic data such as credit scores, income, age and anticipated card use. Because of this the BIN range may also represent a market or demographic segment. For instance co-branded business travel cards are marketed towards persons and organizations that typically utilize the specialized features of a travel card, such as points for travel and/or specialized services to facilitate needs and wants of persons who travel regularly. Another card, the TOYS R US™ card, is provided to young families. Each financial card therefore may be used to target particular consumer needs. The unique BIN range associated with each financial card enables the use of a particular financial card to be identified within the loyalty system (as explained below). This in turn enables merchants to target particular groups of members based on demographic data extrapolated from the financial card that they are using (by operation of the BIN range associated with their card), or more particularly demographic data associated with a sub-set of cardholders using a particular financial card, possibly as communicated by the card issuer.

The preferred embodiment outlined below utilizes the BIN range of co-branded cards to develop additional transactions to selected groups of card holders and promote the use of certain financial cards for the transactions for the benefit of: cardholders, merchants, financial card issuers and merchant acquirers.

As stated earlier, in accordance with the present invention, a card issuer, and thereby one or more of its cardholders, are linked to the loyalty system, such as the loyalty system described in the Co-Pending Patent Application as further particularized herein. The loyalty programs provided by this loyalty system can run in parallel with other loyalty and rewards programs.

In numerous implementations of the present invention, no software or hardware changes are required, therefore the costs of implementation are very low. In one possible implementation of the present invention, as illustrated in FIG. 3, the loyalty system (20) is operable, via the Internet for example, to engage in real time data communications with a card issuer system (38) and/or a merchant acquirer system (40). Accordingly, in a manner known to those skilled in the art, seamless data flows between these systems can be established in order to enable the capture of financial transactions and also the accrual of benefits based on data provided to the loyalty system by each of the card issuer system (38) and the merchant acquirer system (40), as particularized below.

In a particular embodiment of the invention, the loyalty system is not only a loyalty system used by merchants but also becomes a secondary loyalty system for the card issuer for its cardholders. The system of the present invention is operable to provide system tools for the card issuer to receive payments from the merchants in connection with transactions between the merchants and the cardholders of the card issuer who are registered with the loyalty system. In other applications of the present invention, the card issuer generally receives payment from the merchants indirectly through the interchange fees collected by a merchant acquirer from the merchants at the time a transaction is processed on a financial card. In this particular embodiment the card issuer can receive payments and/or points from loyalty system merchants for transactions made by cardholders.

The card issuer may propose to encourage a specific demographic (as defined by a BIN range) to join the loyalty program. In return the merchants in the loyalty system may agree to provide additional payments to the card issuer in the form of points or cash for transactions between merchants and cardholders of a selected BIN range that have registered their financial card with the loyalty system or opted in to the applicable loyalty program. By operation of the loyalty system of the present invention, in a particular aspect of the invention, merchants have the ability to vary the amount or the percentage of the transaction accrued and paid to the card issuer, or some other aspect of the benefit provided. The payment may be in the form of cash or redeemable points. The loyalty system calculates the amount accrued to be paid to the card issuer for each cardholder who is a member by each merchant. The reporting facility provides visibility to the card issuer and the merchant in regard to the amounts accrued and subsequently paid at the end of the measurement period.

The amounts transferred to the card issuer by operation of the present invention may be re-distributed by the card issuer to the cardholders in the form of extra points for transactions completed or the card issuer may retain a percentage of the amount transferred, for example, as an administration fee. In other words, the amounts transferred can then be accrued and distributed in accordance with the card issuer's own rules therefore.

In some circumstances the card issuer and the merchants of the loyalty system may choose to offer special offers/prizes through the merchants and the loyalty system. The card issuer and the loyalty system pre-determine the conditions under which this occurs. When a registered cardholder enters into such a transaction with a merchant in connection with the loyalty system, an amount owed by the card issuer to the merchant is recorded. At the end of the reporting period the system aggregates the amounts owed to merchants by the card issuer and settlement is made and then reimbursement funds are distributed to the respective merchants.

The system results in more transactions on the particular registered financial card of the card issuer, more individuals/businesses owning and using a financial card with a particular BIN range(s) and distribution of the cost of incentives provided the customer by the card issuer and the merchant within the loyalty system. The amounts owed by the merchants or to cardholder/card issuer are tracked within the loyalty system for the accounting period.

The end result is the accrual of benefits in the benefits account (34), which then in accordance with a particular embodiment of the present invention is disbursed on a periodic basis to the applicable card issuers (including as particularized below).

In a particular aspect of the method of the present invention, the operator of the loyalty system enters into a contract with a financial institution that has a plurality of co-branded cards and seeks new customer base potential through the financial institution's co-branded card partners that have an interest in increasing transactions on their co-branded card by attracting merchants. In this case, it is often a business limitation that products and services associated with the loyalty program for the most part will not compete with the co-branded partner's business, i.e. that the businesses involved be complementary. The financial institution contacts and motivates its customer base (cardholders) to join the loyalty program and thereby provide the loyalty system with a stream of new members. As stated earlier, the members joining the loyalty system through this referral source are associated with their co-branded card(s) within the loyalty system, each co-branded card being identified by different BIN number ranges and thereby historical demographics, credit score ranges and preferences associated with the particular card. Cardholders individually join the loyalty program and register their card.

The loyalty program uses the BIN number range and any associated demographic and credit score, along with geography and any customer preferences to direct special offers from merchants to the individual cardholders by operation of the present invention (for example: unique product/service offerings to specific customers). The loyalty system is operable when a member with a co-branded card that is within a suitable BIN number range enters into a transaction with a merchant to record the applicable transaction information, aggregate said transaction information; and supply measured results to both the merchant and the card issuer, including as particularized herein.

Typically there is comity of interest between the merchants and the card issuers, in that merchants will be willing to provide the greatest benefits to the cardholders that the card issuers are most interested in providing incentives to. Accordingly, from a card issuer perspective, the present invention provides an efficient mechanism for maximizing benefits being provided to their preferred customers by having them register with a loyalty system where merchants, in the interest of promoting their own products/services, will automatically provide optimal benefits to these preferred customers.

For example a new member, joining through a co-branded card reference, transacts with the registered financial card, and in the embodiment where the merchant and/or the co-branded issuer supply the additional benefit (which, typically being supplied through the normal co-branded card channels, consists of points, discounts or cash back). The amount paid by the merchant is usually based upon on one or more of the following: (1) the amount of the transaction; (2) the value of the transaction; and/or (3) the value of the transaction less an amount that was set as a pre-condition.

The card issuers benefits financially from the transactions involving their financial cards in numerous ways: (1) cardholders carrying credit card balances; (2) maintaining customers using the benefits and selling other products/services to such customers; (3) acquiring new customers for such products/services using benefits; (4) financial incentives provided to financial institutions in exchange for promotional access to their customers; (5) interchange fees associated with transactions involving the financial cards; (6) yearly card fees; (7) transaction fees charged to the cardholder (if applicable); (8) currency exchange fees; (9) fees payable to the card issuer by merchants (generally tied to BIN ranges); (10) augmentation of card issuer's loyalty program (reduction of costs associated with card issuer's loyalty program, i.e. replacement of card issuer paid benefits with merchant paid benefits; and (11) revenue from merchant acquirer for additional transactions involving the merchant and the merchant acquirer.

The merchant acquirer receives the benefits of: (1) additional merchants who join their processing system to increase their access to a BIN range of cardholders; (2) additional revenue from merchants (participation fees); (3) increased revenue from additional merchant transactions; (4) ability to differentiate over other merchant acquirers based on the ability to provide access to the loyalty system.

The invention provides for a linkage of a data between the loyalty system merchants and card issuers, and thereby their cardholders, facilitated through the loyalty system technology that enables a card issuer to include its cardholders in a secondary loyalty system that supplements any card issuer point system.

It should be understood that loyalty and customer acquisition programs are required to continually acquire new members, preferably at a low cost, e.g. through organic growth or through a partnership with various customer sources, including card issuers. In the instance of merchants participating in prior art loyalty program, card issuers have shown a limited willingness to share cardholder databases, both with other loyalty program operators and with participating merchants, in part because there has been no method to measure and pay them currently except through the interchange mechanism and the transaction fees, or to protect the customer.

In the card transaction process, the card issuer generally has access to the following transaction information: (1) cardholder name; (2) card number; (3) date of transaction; (4) merchant ID; (5) amount of purchase; and (6) BIN number.

While some financial institutions have both card issuing and merchant acquiring business lines, these do not necessarily work together for the common good. The merchant acquirers have access to following additional information that is not generally available to the card issuer: (1) the time of the transaction; (2) the terminal ID (within a merchant system); and (3) the fee rates charged by the merchant based upon the financial card and how the financial card is used (e.g. interne transaction vs. verified signature).

In a particular aspect of the present invention, the loyalty system of the present invention is operable to link the card issuer, the cardholder, the merchant acquirer and the merchants such that the loyalty system is operable to match time of day data of a transaction with other information provided by the card issuer to the loyalty system. This functionality allows merchants to offer time of day special offers to specific cardholders who are members of the loyalty system.

In another specific aspect of the present invention, the loyalty system is operable to match the terminal ID information obtained from the merchant processor with the transaction information obtained from the card issuer. This allows a merchant and/or a card issuer to tailor benefits to specific geographic locations.

The loyalty system platform enables each of the merchants, members and card issuers to track the accrual of benefits by means of financial card transactions that in connection with the loyalty system result in the accrual of loyalty benefits, as particularized herein.

The loyalty system is operable to store the data items mentioned above (and other similar data items) to the database (32) and apply same against transactions between participating members and participating merchants.

Figure 4A:
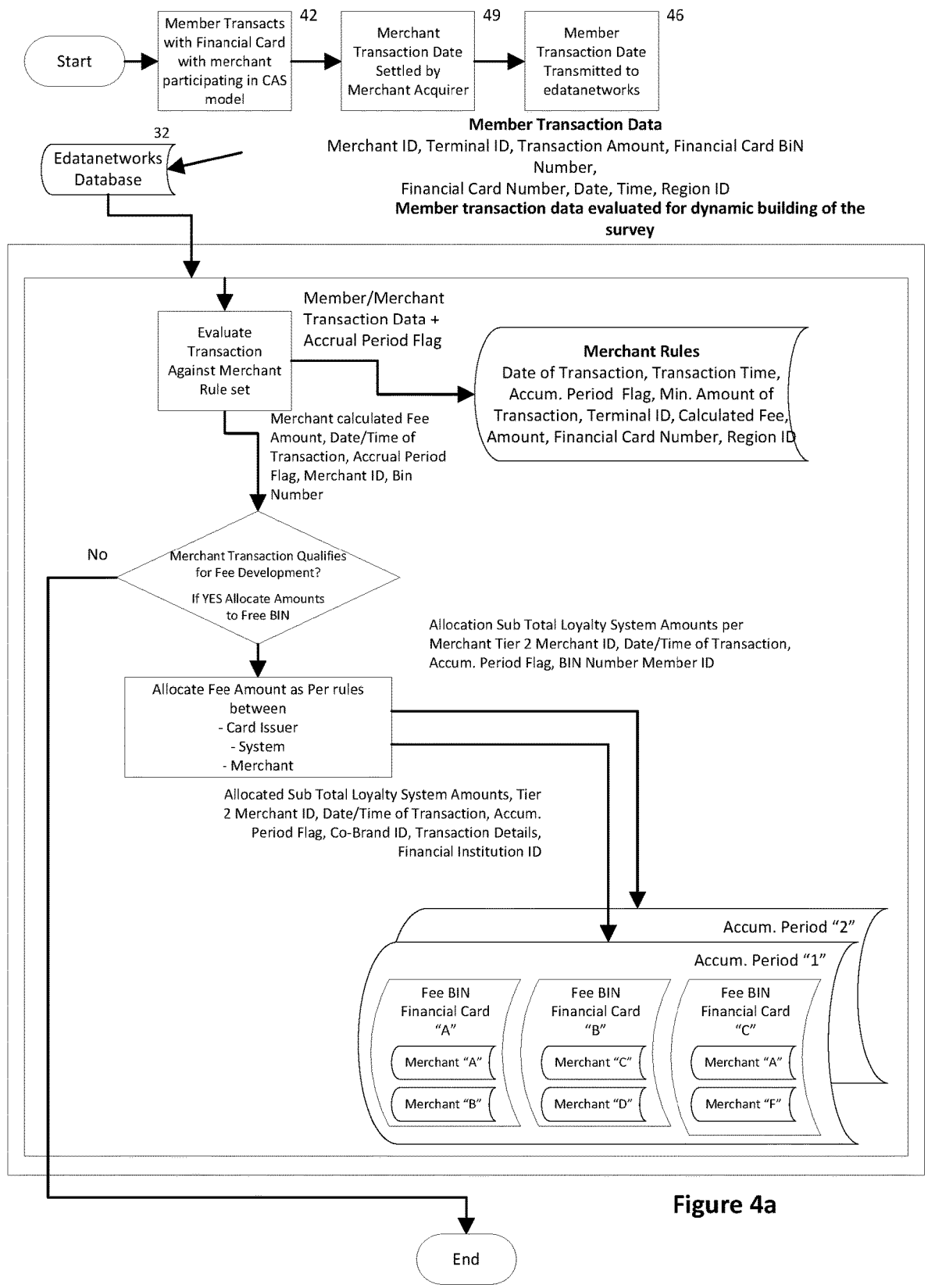
FIG. 4a illustrates the operation of the system of the present invention, in one particular embodiment thereof, specifically in connection with fee accrual.

A particular embodiment of the processes (and the system implementation thereof) related to accrual of benefits is best understood by reference to FIG. 4a. The cardholder who is a member transacts with a merchant using their financial card (40). The merchant transaction data is then usually settled by the merchant acquirer (42). The member transaction data is then preferably transmitted to the loyalty system (44). This member transaction data usually includes the data items described above. This data is then stored to the database (32), which in a preferred embodiment of the present invention is a known relational database. The rules defined for the cardholder within the loyalty system are then applied to the merchant transaction data as particularized in FIG. 4a.

As stated earlier, an agreement is entered into between the card issuer and the operator of the loyalty system on behalf of the merchants. The agreement may extend to one or more accounting periods. The agreement generally establishes the expected relationship and flow of funds between the financial institution and the merchants based on anticipated transactions, as well as the additional incentives that will be provided to the cardholders for transactions linked to the loyalty system and who will be the party covering the costs of such additional incentives and how. The agreement generally covers group of financial cards, identified by a BIN range. Also as stated earlier, cardholders are encouraged by the card issuer to join the loyalty program for additional cash rewards, points and/or special offers.

Prior to the beginning of an accounting period, and after cardholders have registered their particular financial card with the loyalty system, the agreement between the cardholder and the loyalty system is implemented by the merchants who set the offers that will be made to cardholders of certain BIN ranges (these are the merchant rules).

When a cardholder transacts with one of the merchants under the applicable loyalty program, the loyalty system is operable to review the benefits applicable to the BIN number and either 1) accrue the points/cash discount (less the administration amount paid to the card issuer) to the cardholder from the transaction, by reflecting such accrual in the benefits account for the cardholder. The cardholder is notified of the award of points, and the card issuer is notified of the accrual set aside by the loyalty system to be paid by the merchant at the end of the accounting period. These amounts are separate from the amounts paid to the card issuer through the interchange system, unless a special rate for the loyalty system has been established and applied by the merchant acquirer.

The loyalty system accrues the points/special cash back awards for each cardholder and what is owed the card issuer by the merchant. Merchants generally pay cash or cash in lieu of points as a reward to the card issuer. Different incentives/rewards can apply to different BIN ranges by a single merchant or by a group of merchants.

In summary, the merchant rules applicable for a specific accrual period are applied so as to update the benefit account (34) for the particular cardholder, for example by reflecting an accrued fee in the specific embodiment of the invention illustrated in FIG. 4a. Generally speaking, the loyalty system is operable to, after an accrual period has come to an end, to verify the accrued amounts in the benefit accounts (34). These can then be accessed and displayed by members.

After an accrual period is closed, the loyalty system, in a particular embodiment of the present invention, then permits members to access the loyalty system to engage in a number of transactions in connection with their accrued benefits such as redemption, conversion of fees to points etc. A particular process and system implementation thereof for conversion of fees to points is illustrated in FIG. 4b.

Figure 4B:
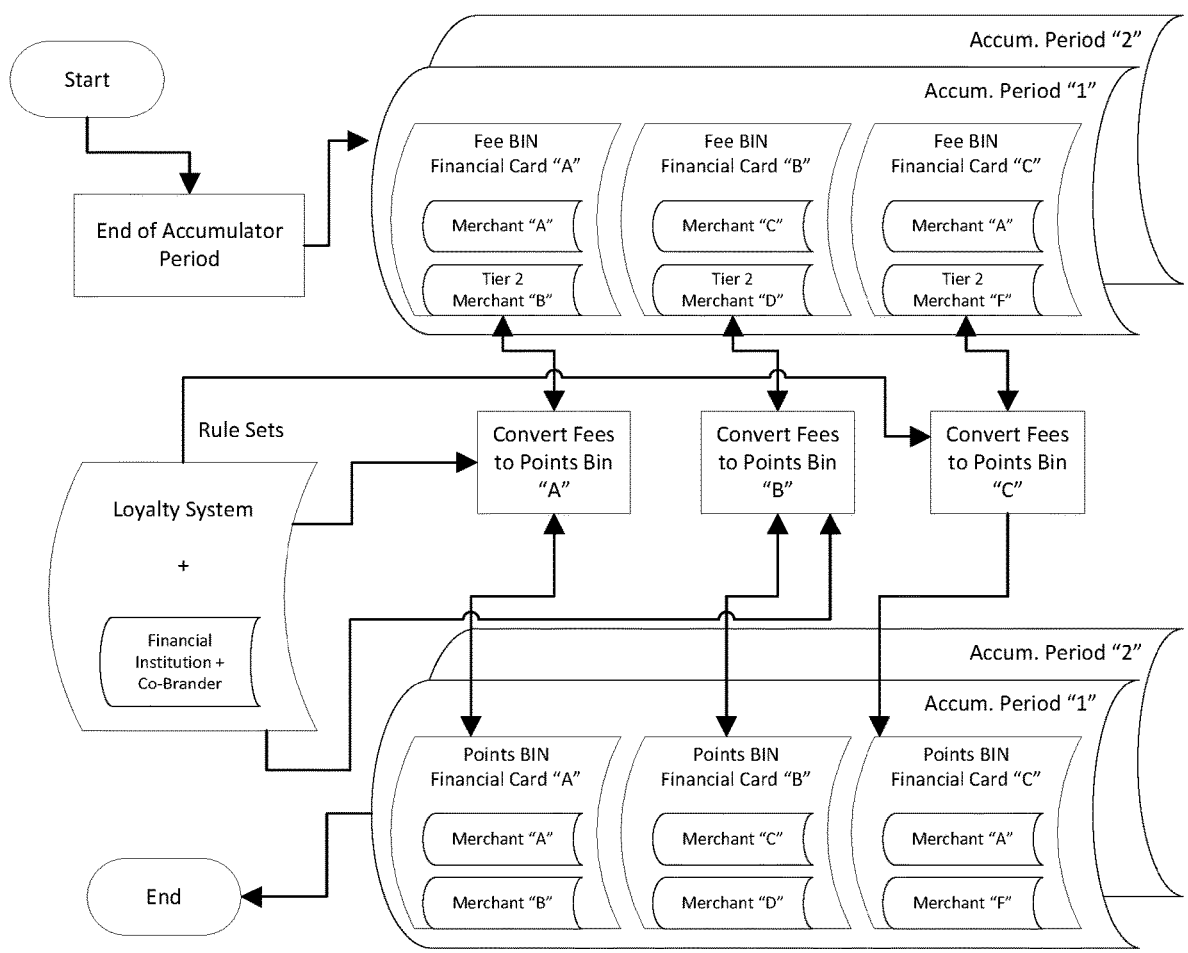
FIG. 4b illustrates the operation of the system of the present invention, in one particular embodiment thereof, specifically in connection with conversion of fees to points.

Specifically, FIG. 4b illustrates the operation of a point conversion utility that is part of the loyalty system of the present invention. The point conversion utility enables enhancement of a card issuer's exiting loyalty programs based upon points or cash back cardholder benefits created by cardholder use in connection with a loyalty program of the present invention. The point conversion utility preferably allows the card issuer to reward their cardholders in the same format as under their existing cardholder program.

For instance, some existing financial cards have points or cash reward systems or a combination of both to promote financial card use. The cardholder may accumulate points and cash rewards for later use. The loyalty system of the present invention allows for the card issuer to take all or a portion of existing fees developed from financial card use and apply them to cardholder points or cash. Alternatively, the loyalty system of the present invention could be utilized by card issuer to create an additional source of revenue from the merchant fees by not converting all of the collected fees and giving the benefit to the financial card holders.

The fee and point information is transferred to the card issuer "X" days after the end of an accumulation period. The information is later integrated by existing financial card issuer software to consolidate the point and/or fees that are passed on to the cardholder.

The conversion from points to fees is accommodated by comparing the transaction data of identified cardholders against rule-sets created and maintained by the card issuer. The rule-sets may, for example, contain the following information regarding transaction data: 1. Transaction Amount 2. Transaction Date 3. Transaction Time 4. Merchant ID 5. Card Holder ID 6. Card BIN number An example of a card issuer rule-set includes: Card Holder Bin number "1111" Min. qualifying transaction with Merchant "A" is $100.00 No Maximum qualifying transaction or conversion restrictions Transaction must occur between 00:00:00-00:07:00 EST Transaction must occur between Jan. 1, 2004 and Jan. 15, 2004 Card Issuer would like to give card holder 1.0 point for every dollar transacted with merchant "A" Merchant "A" Card Holder Id 0-10000 Card Holder BIN Number "2222" Min. qualifying transaction with Merchant "A" is $100.00 Maximum qualifying transaction amount is $1000.00 Transaction must occur between 00:00:00-00:07:00 EST Transaction must occur between Jan. 1, 2004 and Jan. 15, 2004 Card Issuer would like to give card holder 1.0 point for every dollar transacted with merchant "A" Merchant "A" Card Holder Id 0-10000 Card Holder BIN Number "3333" Min. qualifying transaction with Merchant "A" is $100.00 Maximum qualify transaction amount is $10,000.00 Transaction must occur between 00:00:00-00:07:00 EST Transaction must occur between Jan. 1, 2004 and Jan. 15, 2004 Card Issuer would like to record card holder $0.01 benefits for every dollar transacted with merchant "A" Merchant "A" Card Holder Id 0-10000

In another example of the related transaction detail: Card Holder BIN number "1111"-Transaction Amount: $104.00 Transaction Date: Jan. 1, 2004 Transaction Time: 00:00:12

Merchant: "A" Card Holder ID: b 1 Result: System would calculate 100 points for the transaction detail and record the Transaction information and related conversion amount 100 points.

In yet another example of the processing of a transaction by operation of the loyalty system of the present invention:
Transaction Detail
Card Holder BIN Number "2222" Transaction Amount: $90.00 Transaction Date: Jan. 1, 2004 Transaction Time: 00:00:12 Merchant: "B" Card Holder ID: 999999 Result: System would NOT create any points for the transaction because the transaction failed to meet the criteria for point conversion for the transaction detail Merchant "B" is not part of the conversion rule-set Card holder is not part of any existing rule-sets In yet another example of the processing of a transaction by operation of the loyalty system of the present invention:
Transaction Detail
Card Holder BIN Number "3333" Transaction Amount: $900.00 Transaction Date: Jan. 1, 2004 Transaction Time: 00:00:12 Merchant: "A" Card Holder ID: 999999 Result: System would record $0.90 of benefit associated with the above transaction information tied to the card holder ID number of "999999"

Figure 4C:
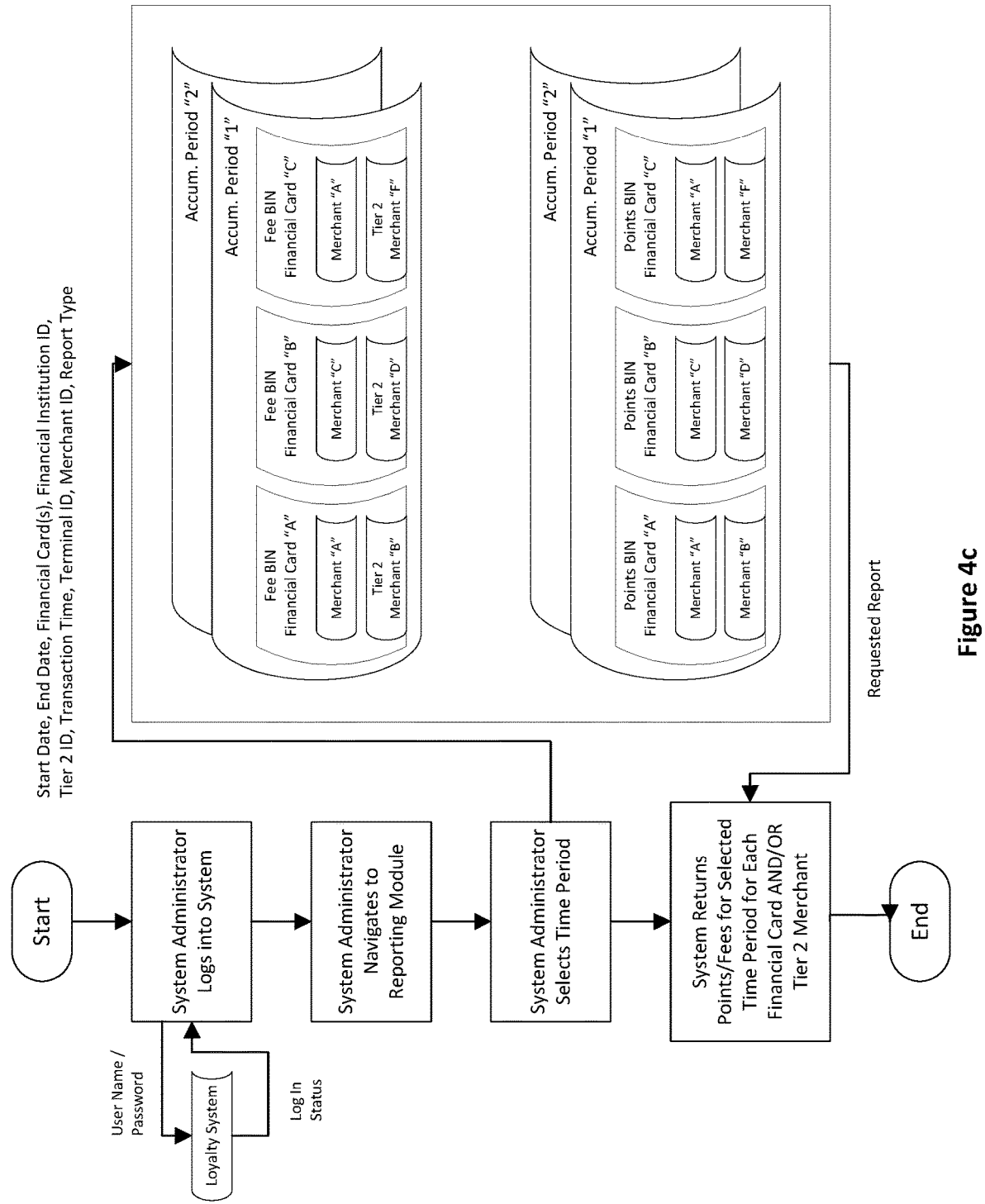
FIG. 4c illustrates the operation of the system of the present invention, in one particular embodiment thereof, specifically in connection with the reporting functionality.

FIG. 4c illustrates the processes and a system implementation thereof in connection the generation of reports based on the contents of database (32). In the specific embodiment illustrated in FIG. 4c, a system administrator of the operator of the loyalty system accesses certain reports in connection with merchant activity in connection with particular BIN ranges. Similar processes and system implementations are used to generate other reports of information accessible to card issuers, merchants, members or merchant acquirers. These reports are provided in a manner that is known.

The loyalty system is operable to generate reports for card issuers to track the use and monitor the results of financial card use with identified merchants For instance a card issuer may wish to view the status of conversion of points to fees. The loyalty system, in one particular implementation thereof, allows for a System Administrator to log in and generate reports regarding the amount of fees that have been converted to points to monitor the effectiveness of the applicable loyalty program.

Example 1.0

The System Administrator enters the following parameters for report generation on behalf of the card issuer: 1) Start Date 2) End Date 3) BIN Number 4) Financial Institution ID 5) Merchant ID 6) Transaction Time 7) Transaction Terminal ID 8) Report Type The loyalty system returns the data associated with the transaction(s) to monitor the points and fees collected and converted to allow the card issuer to view data regarding the status of the system.

A card issuer may want to know which merchants are supporting a particular financial card to judge the effectiveness of the business relationship between the merchant and the cardholders. By examining the transaction information the card issuer can judge the effectiveness of having particular merchants within the loyalty system, based on collected merchant fees. A cardholder may elect to charge the merchant additional fee amounts as the merchant receives strong support from the cardholders of a particular card issuer.

The described reporting functionality can also be used to track the data necessary to integrate the data of points and fees held within the loyalty system for a given time period. A card issuer may elect to view the information to keep current information regarding benefits that are due to the cardholders.

By examining the data of accumulated points and fees a card issuer may elect to alter the conversion rules to give more benefits to the cardholders and thereby create more demand for a financial card use at a particular merchant(s). This type of reporting can also be used to prove the value to the merchants and cardholders derived from card use at an identified merchant(s).

Merchants may generally view only the information regarding the transactions that were made with identified cardholders. The loyalty system of the present invention allows for a System Administrator to see the following information: 1) Time range of transactions 2) Date range of transactions 3) BIN Range of transactions 4) Summary amounts of transactions The loyalty system generally restricts the information that the merchant can view by providing summary data only. The summary data protects the cardholders from direct exposure of private cardholder information, while allowing the merchant to view the status of the program.

For instance a merchant may wish to know how certain cards identified by BIN number are contributing to his sales. By comparing this information with historical reports and current internal customer payment methods a merchant can judge which financial card types are providing the most benefit for his organization.

Figure 4D:
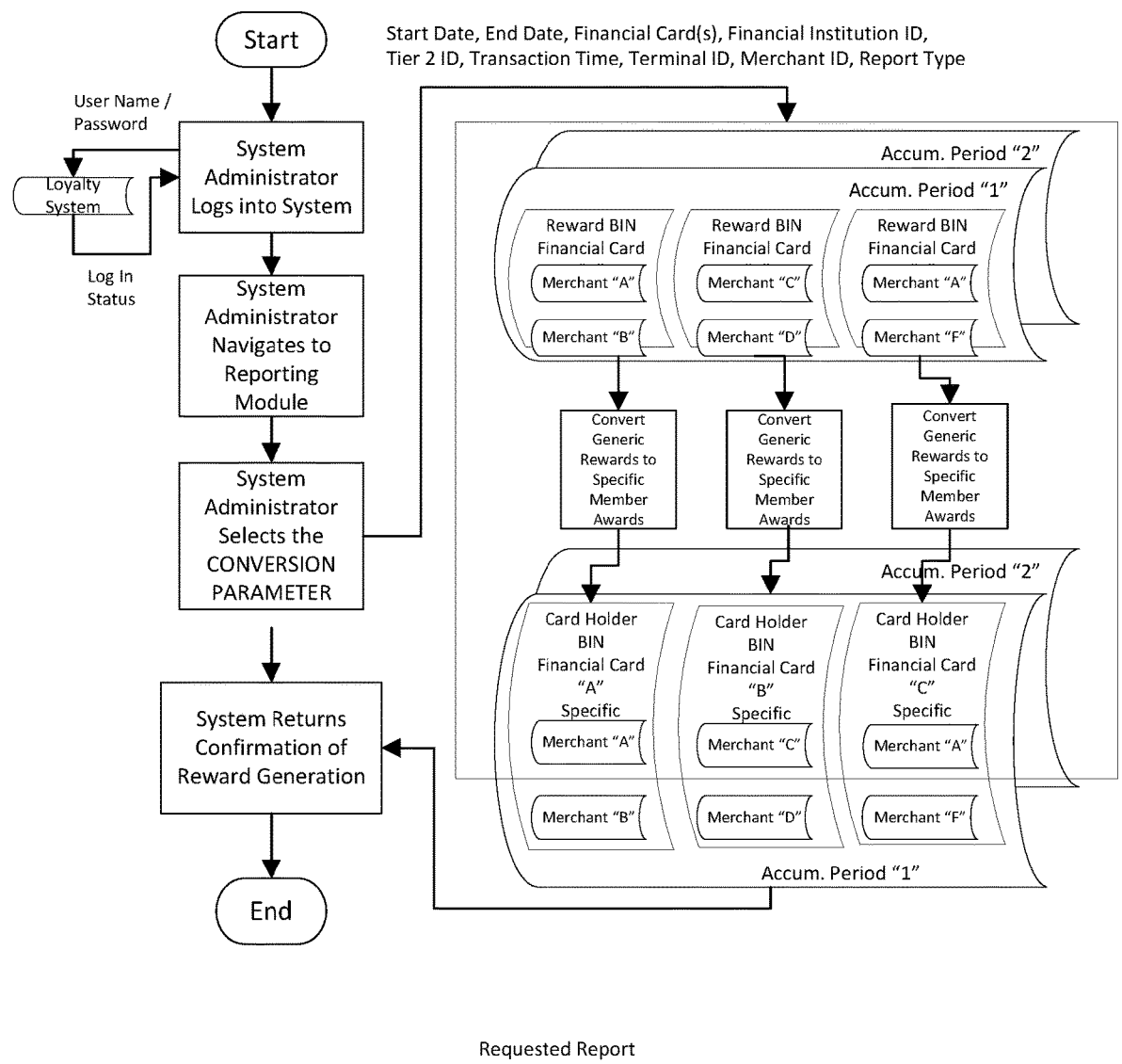
FIG. 4d illustrates the operation of the system of the present invention, in one particular embodiment thereof, specifically in connection with dynamic reward development.

FIG. 4d illustrates one particular process and system implementation for customizing loyalty programs involving cardholders, specifically a system administrator for the operator of the loyalty system adjusting the parameters associated with reward generation in connection with specific members.

In a particular aspect of the present invention, the cardholder benefits processing utility (30) is further associated with a means for processing financial transactions (or transaction utility (not shown) that is operable to conduct electronic transactions between loyalty system and the card issuer (for example via the card issuer system (38)) possibly also between the loyalty system and the merchant acquirer (for example via the merchant acquirer system (40).

Figure 5:
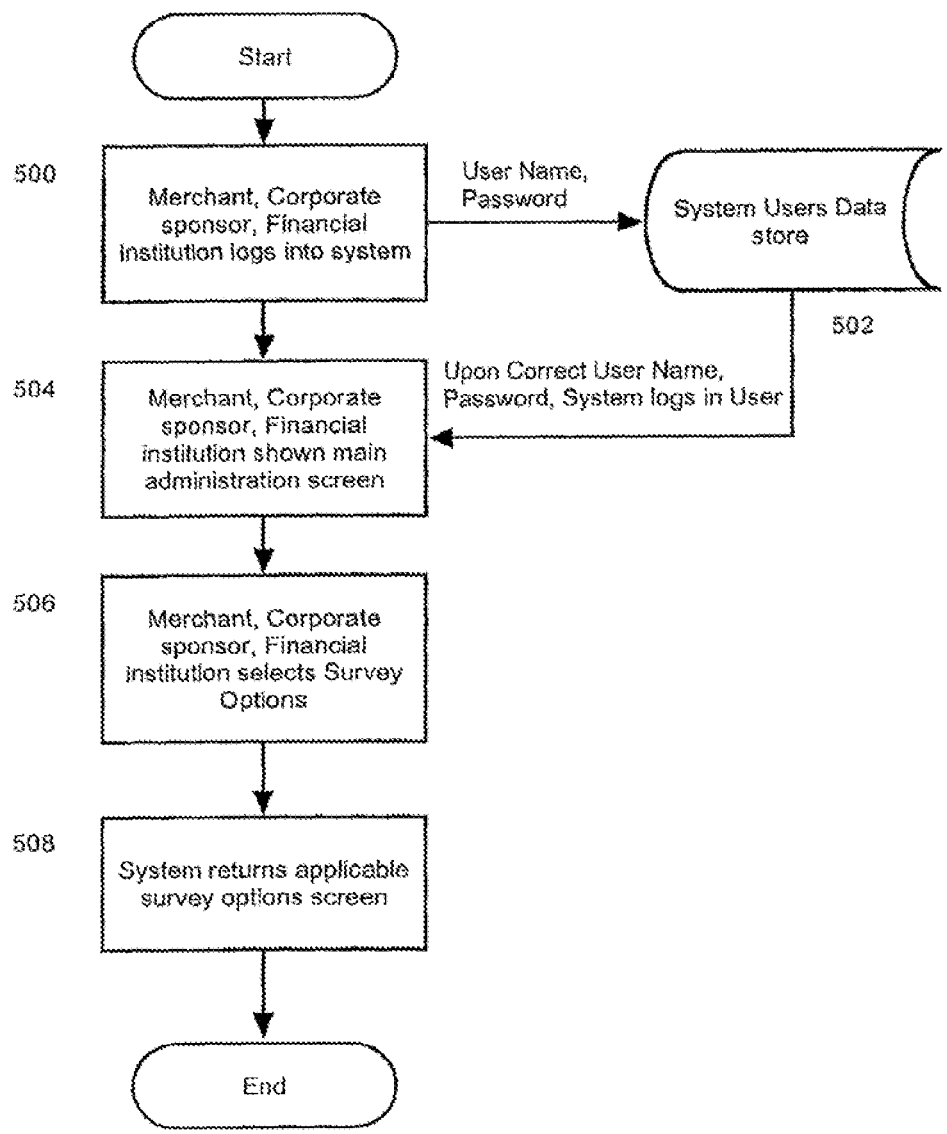
FIG. 5 illustrates the access to the survey utility by the merchant, corporate sponsor and financial institution.

FIG. 5 illustrates access to a survey utility (not shown) of the present invention, which in one aspect thereof is available to a merchant, corporate sponsor, and/or financial institution. More particularly the merchant, the corporate sponsor and the financial system may log into (500) the survey utility of loyalty program system. Once validated (502) by the system, the user (wherein user is defined as the merchant, the corporate sponsor, or the financial institution) are shown (504) to the main administration screen. The user then selects (506) the survey options and the system returns (508) the applicable survey options screen, in one particular embodiment of the present invention. It should be noted that the member or card holder may receive certain incentives to complete the survey. An example of such an incentive but not limited thereto is presentation offers, and rewards/prizing.

Figure 6:
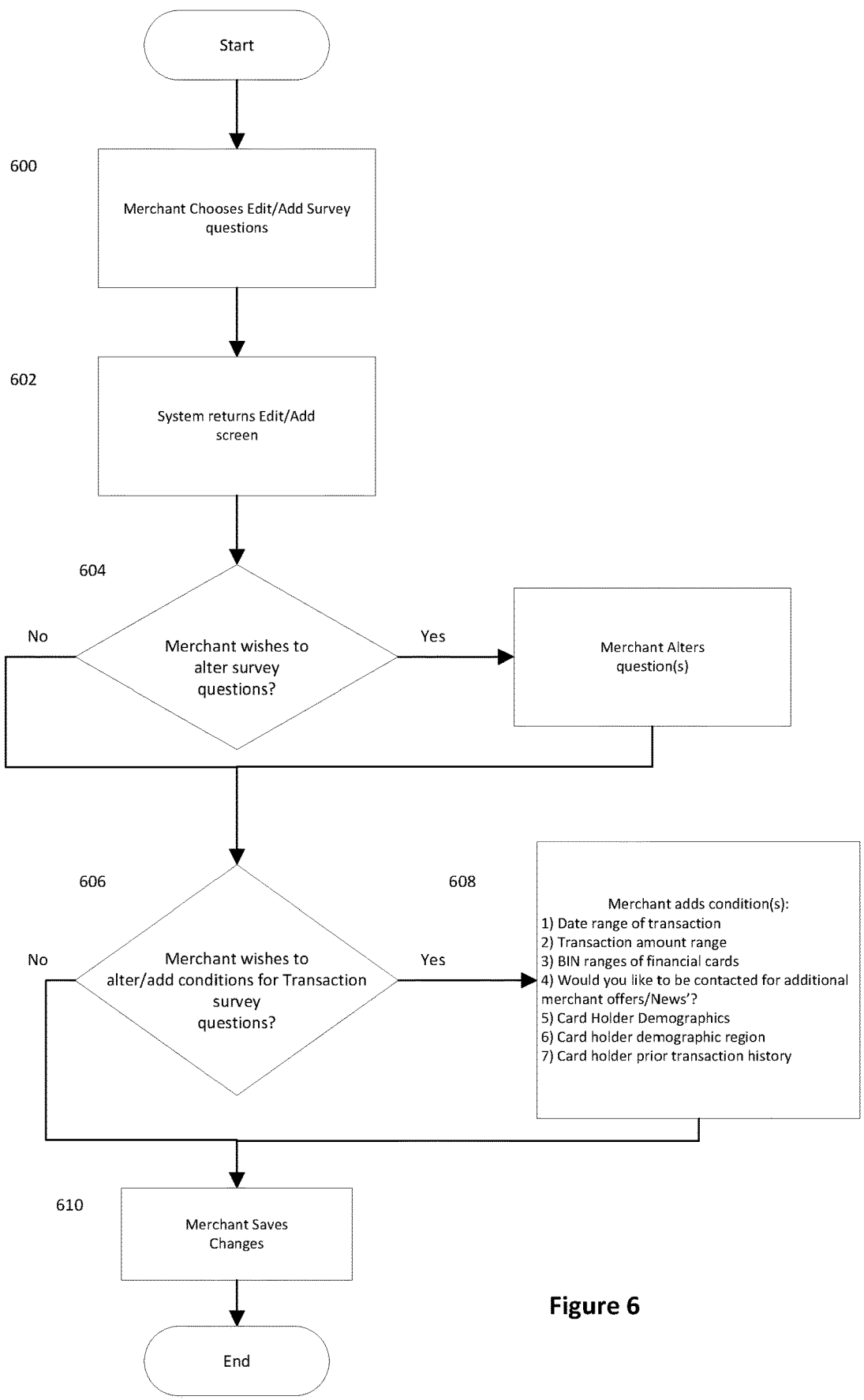
FIG. 6 illustrates the adding/editing of the conditions for a merchant based transaction survey.

FIG. 6 illustrates adding/editing of conditions for a merchant based transaction triggered survey. In a particular aspect of the present invention, the system allows for the issuance of a survey to a transacting member based upon a predefined set of rules/conditions. If these rules/conditions have been met, the member may receive a request to complete a survey. In order to edit or add to these predefined rules/conditions, from a merchant's perspective, the merchant may log into the proper system utility. Once logged into the survey utility (see FIG. 5), the merchant may select to edit/add (600) survey questions. The system may respond by returning the edit/add screen (602). The merchant may then select to alter (604) survey questions or alter/add (606) survey questions. A list of parameters (608) that may be edited or added includes but is not limited to: date range of a transaction, transaction amount, BIN ranges of the financial cards, if the card holder has indicated that they would like to be contacted for merchant offer/news, card holder demographics, card holder geographic region, card hold prior transaction history. Once the changes have been made, the merchant may save the changes (610) and exit the utility.

Figure 7:
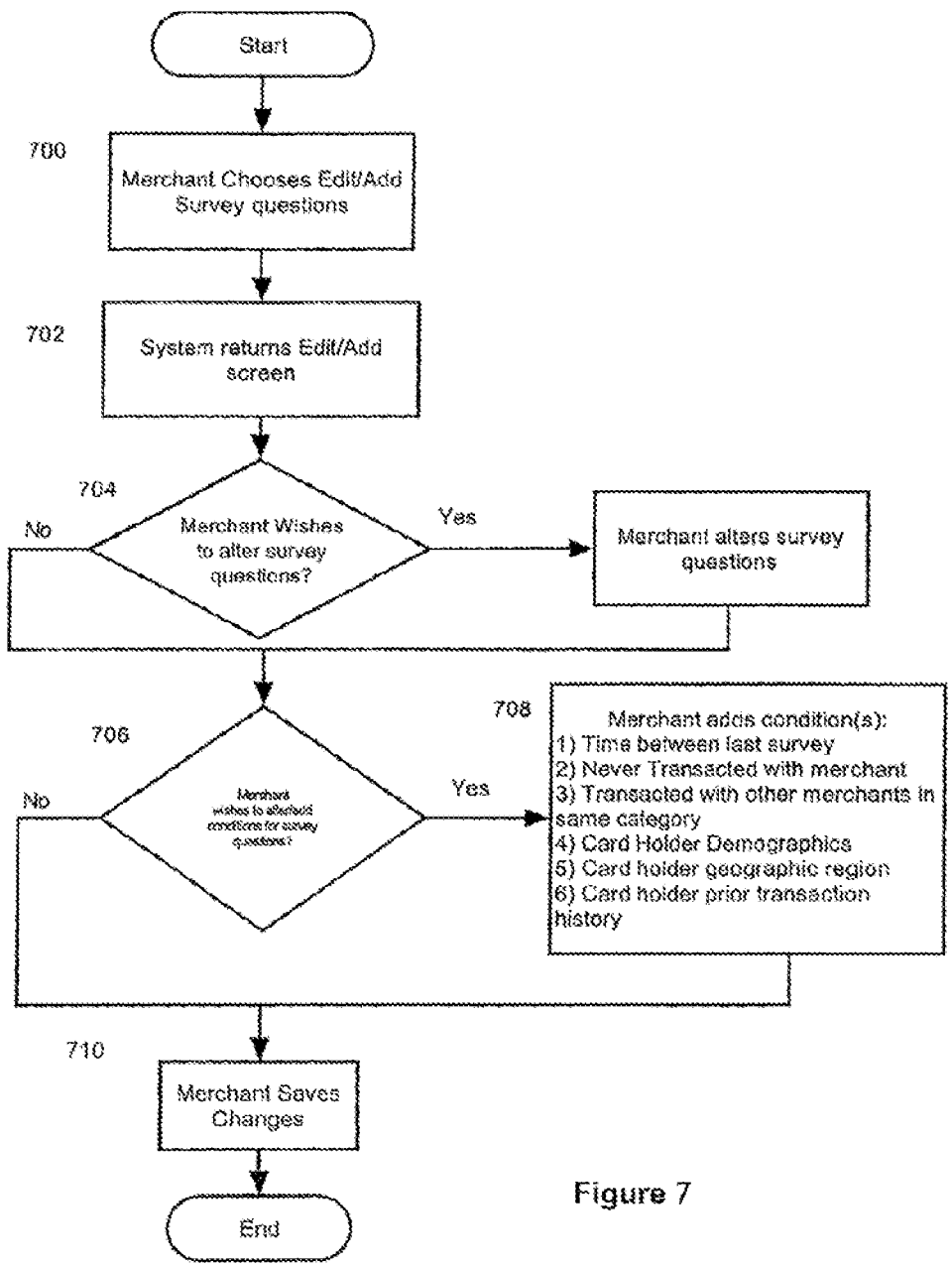
FIG. 7 illustrates the adding/editing of the conditions for a merchant based non-transaction survey.

FIG. 7 illustrates adding/editing of the rules/conditions for a merchant based non-transaction survey. Specifically, the system may allow for members to be surveyed on a periodic basis without the requirement of a transaction. The system may select the members to be surveyed based upon a predefined set of rules/conditions. In a similar manner as the merchant based transaction survey (see FIG. 6), if the conditions have been met, the non-transacting member may be surveyed. Similarly, the merchant has the ability to add/edit the rules/conditions by which a non-transacting member is selected. In a similar manner as the previously described transacting member, the merchant wishing to survey non-transacting members, may log onto the survey utility (see FIG. 5) and may proceed in the exact manner as the previously described transacting member (see FIG. 6). The merchant may select to edit/add (700) survey questions. The system responds by returning the edit/add screen (702). The merchant may then select to alter (704) survey questions or alter/add 706) survey questions. However the list of parameters (708) that may be available to the merchant are different as compared to the previous iteration (see FIG. 6). These parameters include but are not limited to the following: time between last survey, never transacted with merchant, transacted with other merchants in the same category, card holder demographics, card holders geographic region, card holders prior transaction history. Once the changes have been made, the merchant may save the changes (710) and exit the utility.

It should be noted that system generated surveys whether transacted based as described in FIG. 6 or non-transacted based as described in FIG. 7, may be subdivided into a multi-part questionnaire. The advantage of a multi-part questionnaire is that the member may receive additional offerings or prize opportunities for completing the varying parts of the survey as an added incentive.

Figure 8:
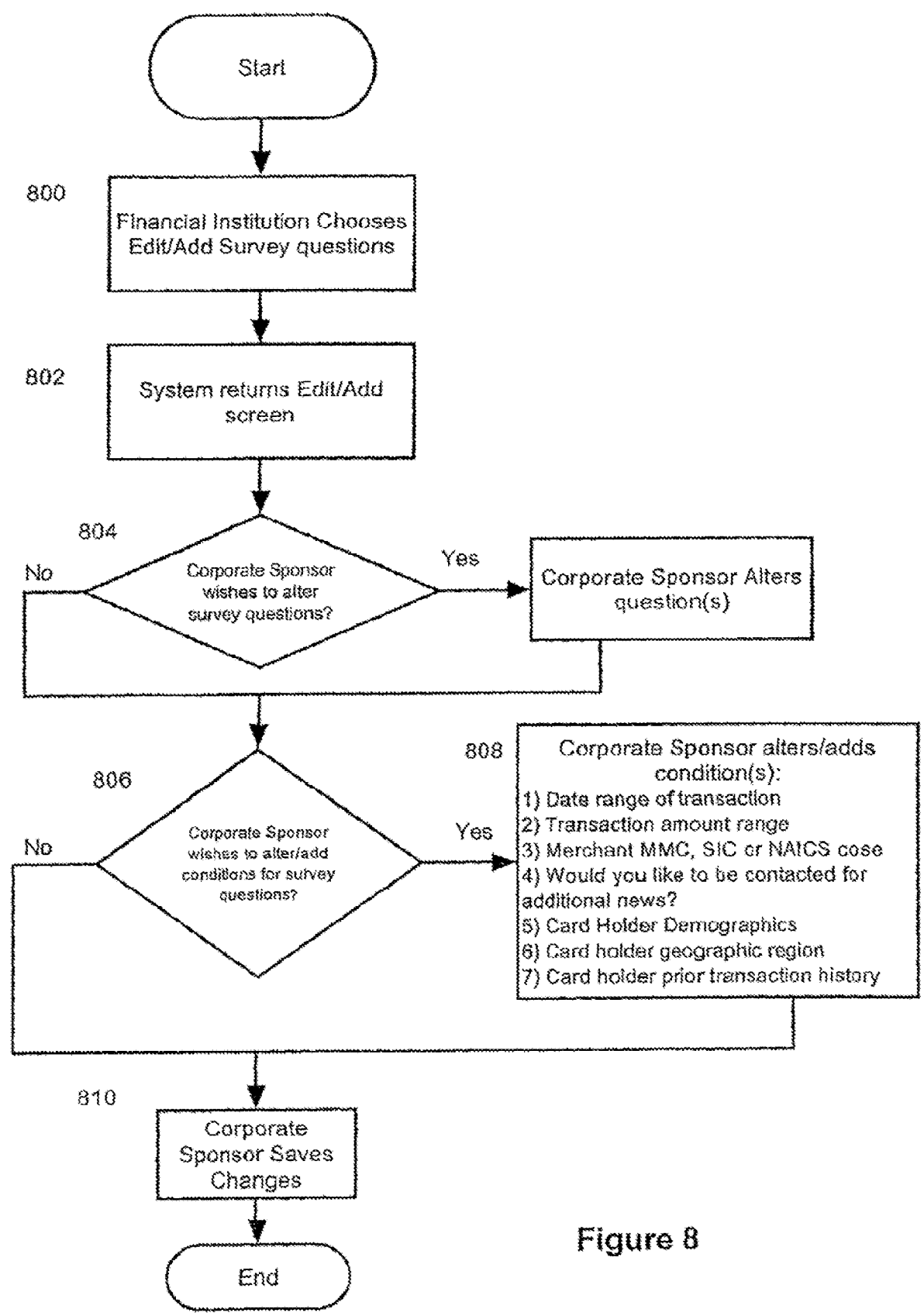
FIG. 8 illustrates the adding/editing of the conditions for a corporate sponsor based transaction survey.

FIG. 8 illustrates adding/editing of the conditions for a corporate sponsor based transaction survey. In particular, the system may allow for the issuance of a survey to a transacting member based upon a predefined set of rules/conditions. If the conditions have been met, the member may receive a request to complete a survey. In order to edit or add to these predefined rules/conditions, from a corporate sponsor's perspective, the corporate sponsor may log into the appropriate survey utility. Once logged into the survey utility (see FIG. 5), the corporate sponsor may select to edit/add (800) survey questions. The system may respond by returning the edit/add screen (802). The corporate sponsor may then select to alter (804) survey questions or alter/add (806) survey questions. A list of parameters (808) that may be edited or added includes but are not limited to: date range of a transaction, transaction amount, merchant MMC, SIC or NAICS code, if the card holder has indicated that they would like to be contacted for corporate sponsor offer/news, card holder demographics, card holder geographic region, card hold prior transaction history. It should be noted that merchant acquirers may provide the equipment and transaction data structure. The merchant acquirer may also adopt the role of system administrator and may oversee as well as conduct their own surveys of the members. Merchant acquirers commonly use classification systems related to industries including the aforementioned NAICS (National Industry Classification System which were formerly the SIC and MMC codes. In general, these codes assist the system to identify certain types of merchants and provide an additional basis to assist in merchant segmentation. Once the changes have been made, the corporate sponsor may save the changes (810) and exit the utility.

Figure 9:
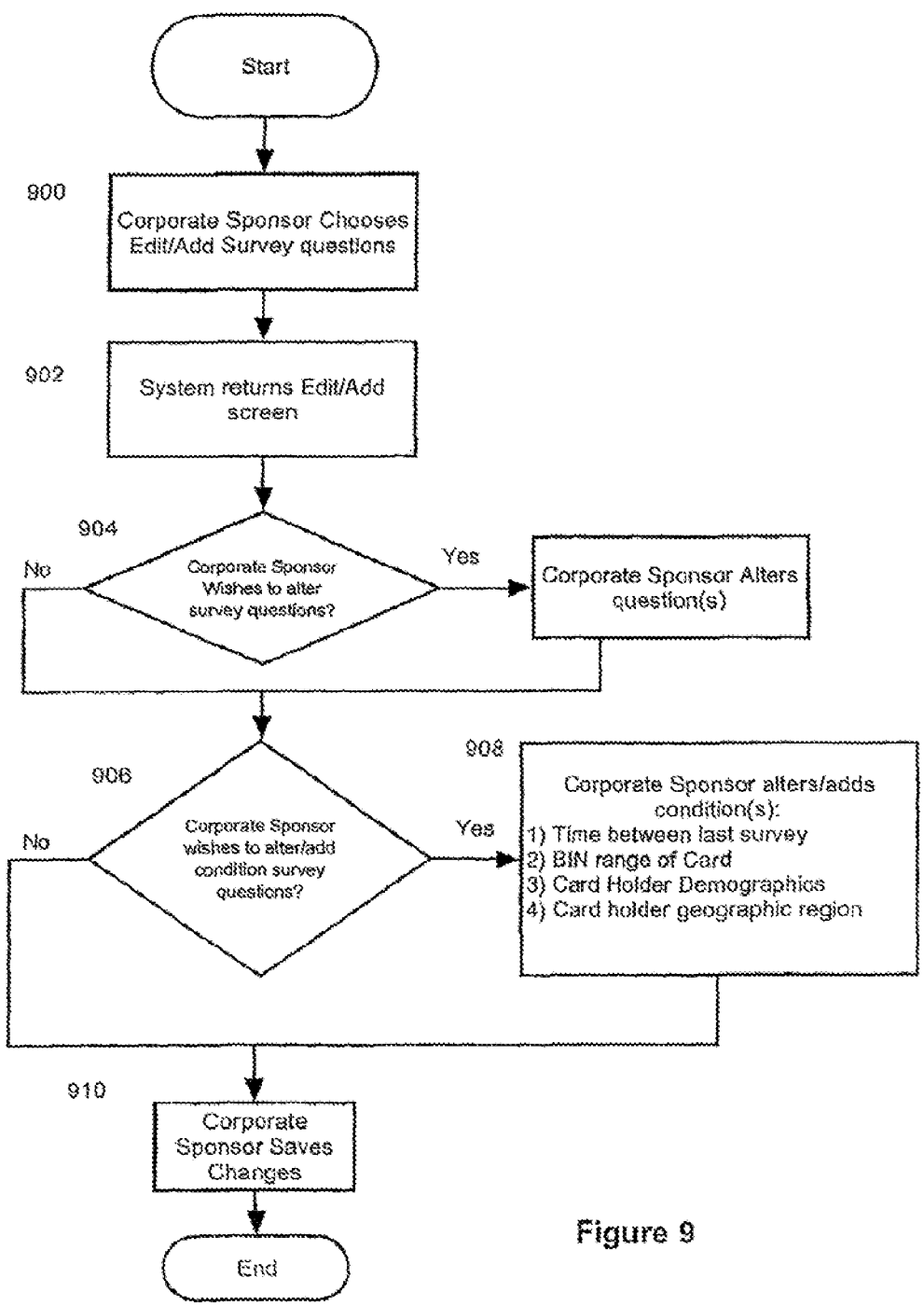
FIG. 9 illustrates the adding/editing of the conditions for a corporate sponsor based non-transaction survey.

FIG. 9 illustrates adding/editing of the conditions for a corporate sponsor based non-transaction survey. Specifically, the system may allow for members to be surveyed on a periodic basis without the requirement of a transaction. The system may select members to be surveyed based upon a predefined set of rules/conditions. In a similar manner as a corporate sponsor based transaction survey (see FIG. 8), if the conditions have been met, the non-transacting member will be surveyed. Similarly, the corporate sponsor may have the ability to add/edit the rules/conditions by which a non-transacting member is selected. In a similar manner as the previously described transacting member, the corporate sponsor wishing to survey non-transacting members, may log onto the survey utility (see FIG. 5) and may proceed in the exact manner as the previously described transacting member (see FIG. 8). The corporate sponsor may select to edit/add (900) survey questions. The system may respond by returning the edit/add screen (902). The corporate sponsor may then select to alter (904) survey questions or alter/add (906) survey questions. However the list of parameters (908) that are available to the corporate sponsor may be different as compared to the previous iteration (see FIG. 8). These parameters include but are not limited to the following: time between last survey, BIN range of card, card holder demographics, card holders geographic region, card holders prior transaction history. Once the changes have been made, the corporate sponsor may save the changes (910) and exit the utility.

Figure 10:
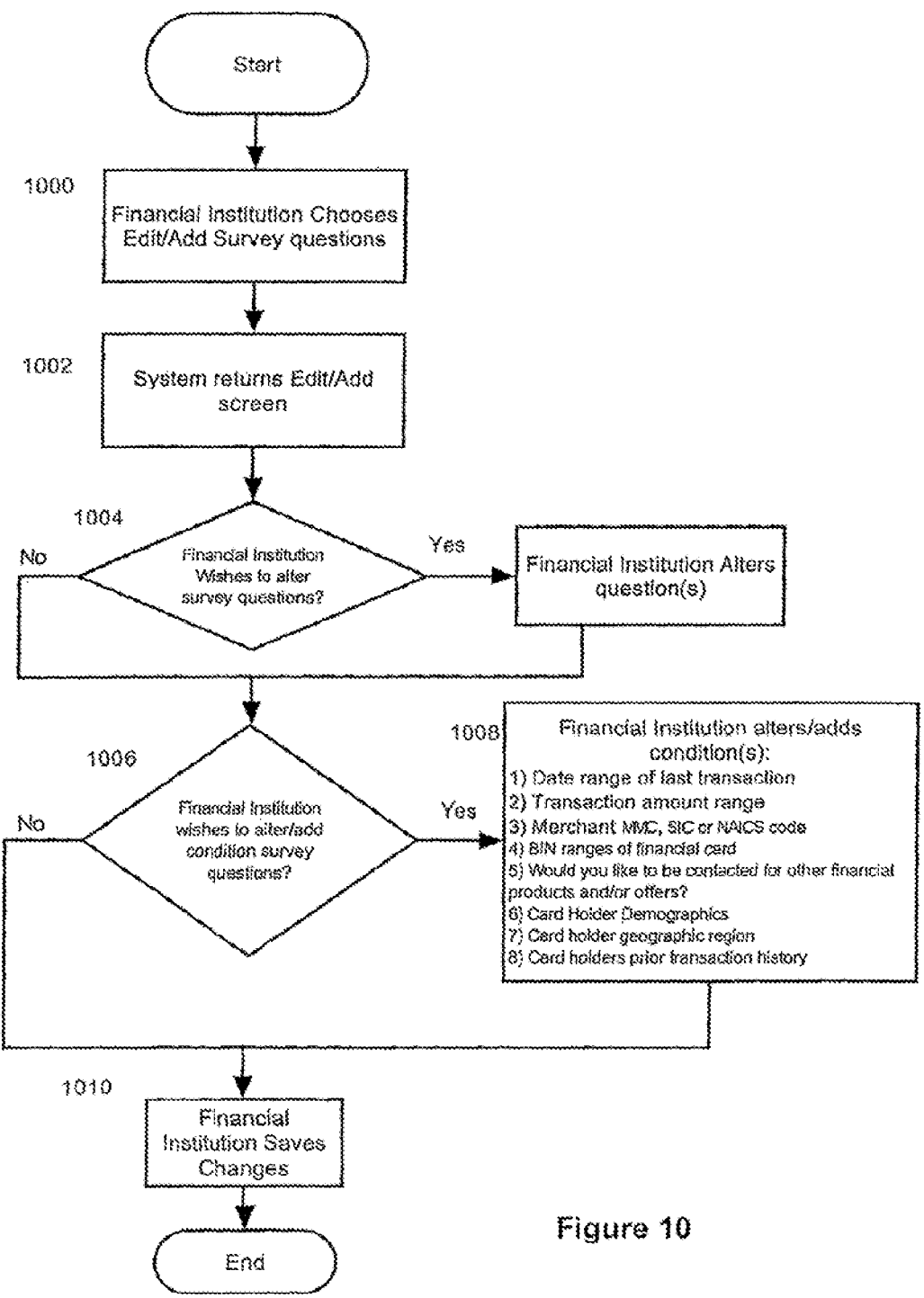
FIG. 10 illustrates the adding/editing of the conditions for a financial institution based transaction survey.

FIG. 10 illustrates the adding/editing of the conditions for a financial institution based transaction survey. In particular the system may allow for the issuance of a survey to a transacting member based upon a predefined set of rules/conditions. If the conditions have been met, the member may receive a request to complete a survey. In order to edit or add to these predefined rules/conditions, from a financial institution's perspective, the financial institution may log into the appropriate survey utility. Once logged into the survey utility (see FIG. 5), the financial institution may select to edit/add (1000) survey questions. The system responds by returning the edit/add screen (1002). The financial institution may then select to alter (1004) survey questions or alter/add (1006) survey questions. A list of parameters (1008) that may be edited or added includes but is not limited to: date range of a transaction, transaction amount, merchant MMC, SIC or NAICS code, BIN range of financial card, if the card holder has indicated that they would like to be contacted for financial institution offers/news/products, card holder demographics, card holder geographic region, card hold prior transaction history. Once the changes have been made, the financial institution may save the changes (1010) and exit the utility.

Figure 11:
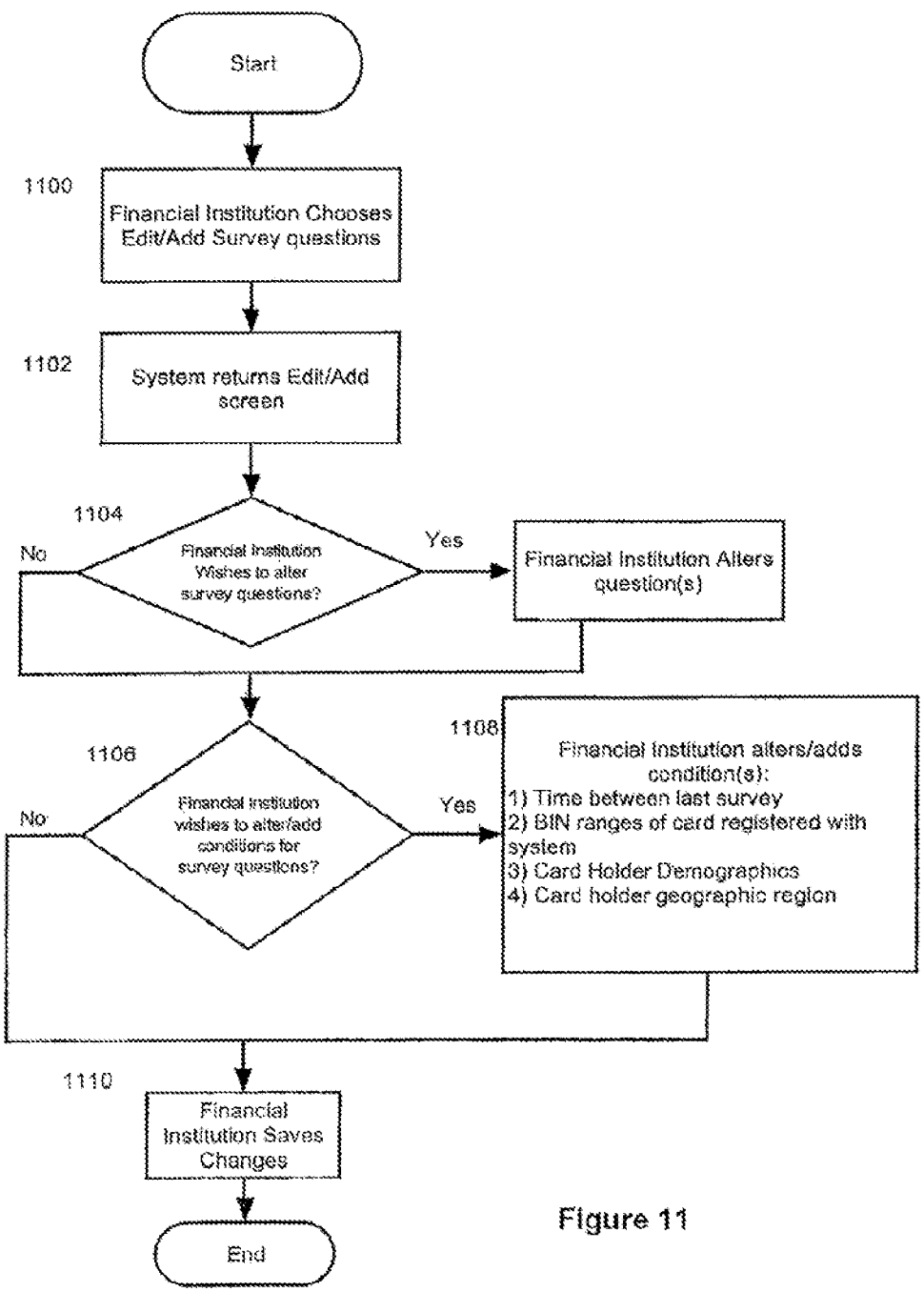
FIG. 11 illustrates the adding/editing of the conditions for a financial institution based non-transaction survey.

FIG. 11 illustrates adding/editing of the conditions for a financial institution based non-transaction survey. Specifically, the system may allow for members to be surveyed on a periodic basis without the requirement of a transaction. The system may select the members to be surveyed based upon a predefined set of rules/conditions. In a similar manner as the financial institution based transaction survey (see FIG. 10), if the conditions have been met, the non-transacting member may be surveyed. Similarly, the financial institution may have the ability to add/edit the rules/conditions by which a non-transacting member is selected. In a similar manner as the previously described transacting member, the financial institution wishing to survey non-transacting members, may log onto the survey utility (see FIG. 5) and may proceed in the exact manner as the previously described transacting member (see FIG. 10). The financial institution may select to edit/add (1100) survey questions. The system may respond by returning the edit/add screen (1102). The financial institution may then select to alter (1104) survey questions or alter/add (1106) survey questions. However the list of parameters (1108) that are available to the financial institution may be different as compared to the previous iteration (see FIG. 10). These parameters include but are not limited to the following: time between last survey, BIN range of card, card holder demographics, card holders geographic region. Once the changes have been made, the financial institution may save the changes (10) and may exit the utility.

FIG. 12 illustrates an example of a transaction based survey. As evidenced by the example, the survey may be geared from several different perspectives: the merchant, a corporate sponsor, a financial institution and lastly the administrator of the system may request card holder/member input regarding the loyalty system.

Figure 13:
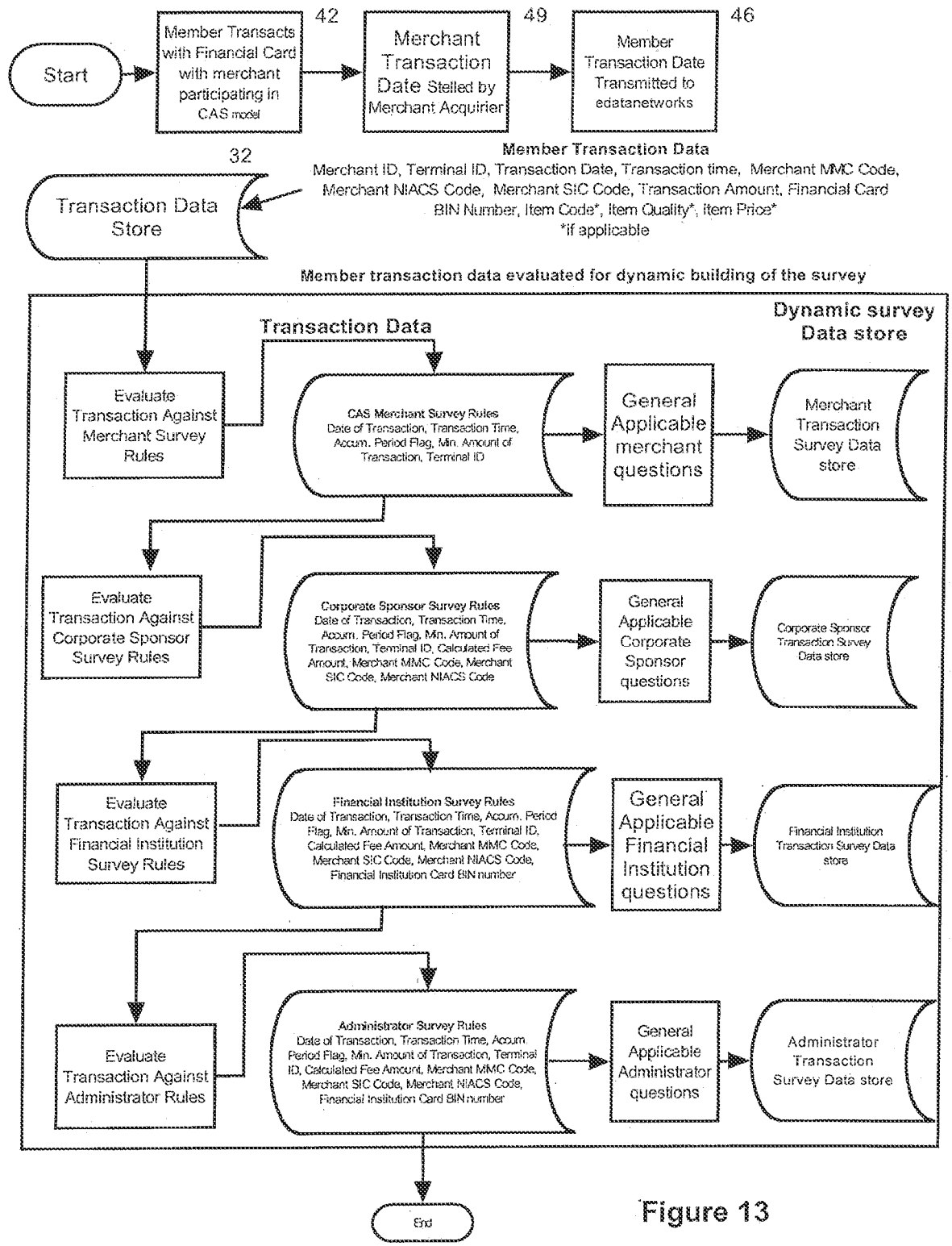
FIG. 13 illustrates an example of data collection and application of the dynamic rule sets for survey development.

FIG. 13 illustrates an example of data collection and application of the dynamic rule sets for survey development. A particular embodiment of the processes (and the system implementation thereof) relates to accrual of benefits is best understood by reference to FIG. 13. This FIG. 13 commences in the same manner as previously described FIG. 4a wherein the cardholder who is a member may transact with a merchant using their financial card (42). The merchant transaction data is then usually settled by the merchant acquirer (49). The member transaction data may then be transmitted to the loyalty system (46). This member transaction data usually includes the data items described above. This data is may then be stored to the database (32), which in a preferred embodiment of the present invention may be a known relational database. The transactional rules defined for the cardholder by the merchant, corporate sponsors, financial institutions, and administrator (see FIGS. 7-12) within the loyalty system may then be applied to the member transaction.

FIG. 14 illustrates the member feedback page. The basis of this particular aspect of the survey utility is the ability for the member to input feedback to the system. Due to the plurality of merchants, corporate sponsors, manufacturers (merchant acquirers), and financial institutions in order to organize their particular member surveys, they may be represented as specific icons. In order to complete a specific survey, the member may simply select a specific icon.

Figure 15:
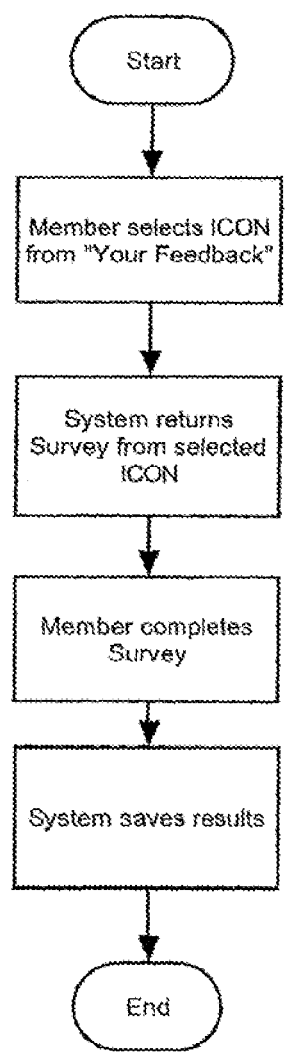
FIG. 15 illustrates the method by which a member may provide feedback to a particular merchant, corporate sponsor, manufacturer and financial institution.

FIG. 15 illustrates the method by which a member may provide feedback to a particular merchant, corporate sponsor, manufacturer (merchant acquirer), or financial institution. Once the corresponding icon has been selected (see FIG. 14), the member may receive their survey as produced by the system based upon the predefined rules and conditions. The member may complete the survey and it then may be saved by the system.

Figure 16:
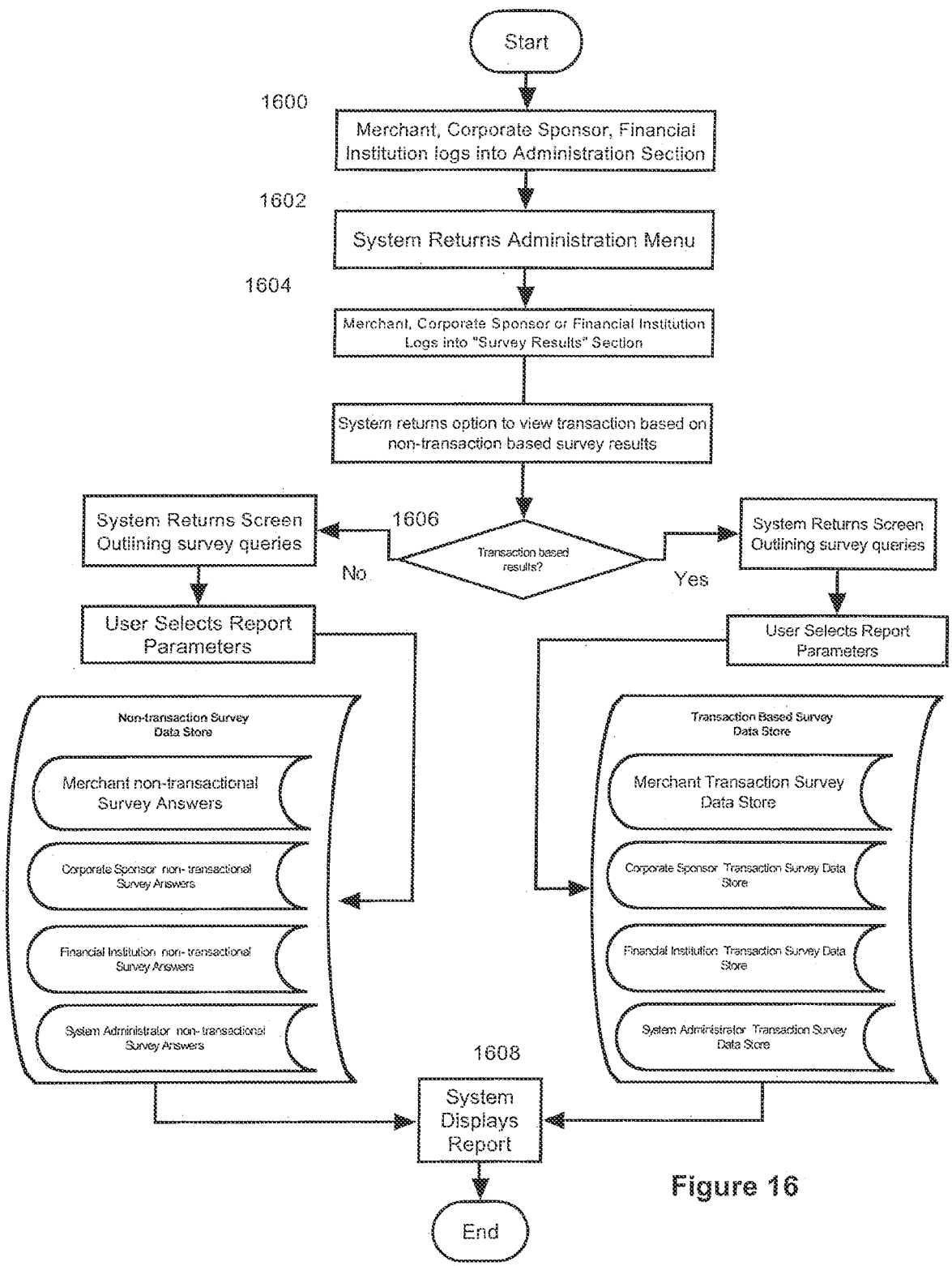
FIG. 16 illustrates the survey reporting module view accessible by the merchants, corporate sponsors, financial institutions.

FIG. 16 illustrates, in a particular aspect of the present invention, a survey reporting module view accessible by the merchants, corporate sponsors, financial institutions, and/or the system administrator. In order to reap the benefit of this collected survey information, the merchants, corporate sponsors, financial institutions or system administrator may log into the survey results section of the system. This is accomplished by first logging into the administration section (1600) of the system, from there; the system returns the administration menu (1602). The user must then decide (1606) to view the transactional vs. non-transactional based surveys. Based upon the user selection and the classification of the use (i.e. merchant, corporate sponsor, financial institution or system administrator), the system may display a report (1608) of the corresponding survey information.

Examples in Operation

It should be understood that the cost of acquiring new customers is generally quite high, and this is a cost that merchants tend to monitor very closely. Particularly if a merchant's relationship with card issuers, by operation of the present invention, permits the merchant to acquire a new customer through the card issuer, merchants may be willing to provide to the cardholder and/or to the card issuer relatively significant benefits in consideration of obtaining the new customer. It should be understood that the present invention enables a merchant to target benefits to particular sub-groups of cardholders, depending on their interest to merchant, as explained herein.

A cardholder whose BIN number is associated with the program may go to a merchant who is also associated with the program. Within the loyalty system, the cardholder (in one particular implementation of the present invention) may be given a code to be presented at the merchant's location that reflects a discount offer. Upon payment, the cardholder may receive a discount on monies owed. The cardholder in the above example may be given an additional item from the merchant's inventory as recognition for the cardholder being a member of the applicable loyalty program.

After the cardholder transaction has been completed the transaction data may be relayed to the loyalty system and the cardholder benefits processing utility (34) may automatically offer prize entries as a follow up to the cardholder's purchase, possibly based on the loyalty program rules defined by the merchant.

In one particular implementation of the present invention, after the cardholder transaction has been completed the transaction data is relayed to the system. The loyalty system may define in accordance with a particular loyalty program a set of rules to complement existing points programs by converting the transaction data (e.g. identified merchant, amount of transaction, date of transaction, time of transaction) to convert the transaction into points in connection with the applicable card issuer's BIN range point program and based upon parameters optionally set by each participating merchant. For instance, the system may convert transaction incentives or prizes within the loyalty program to points provided through the card issuer to the cardholder based on a pre-determined formula (usually based on an arrangement between the card issuer and the merchants, facilitated by the operator of the loyalty system). The loyalty system may for example convert a $100.00 spent by a cardholder under a loyalty program into 100 points if the transaction was completed between the hours of 00:00:00 and 12:00:00 Monday through Friday and 50 points at any other time for the particular card used at a particular merchant.

The cardholder in the above example my visit a merchant participating in the loyalty system. The cardholder may choose to use the financial card that is registered with the loyalty system over other financial cards, and complete a transaction. The loyalty system may identify the merchant, the date, the amount and optionally the time of day and the terminal ID and also may establish any accrued benefits including points, prizes or discounted offers, as already explained. It should be understood that the card issuer in this case receives additional revenue from increased card use as the cardholder chooses the registered card issuers' card over another financial card.

In a particular implementation of the present invention, the loyalty system may allows for the existing point programs operated by the card issuer to be identified and supported within the loyalty system. This occurs when, after conversion of incentives (for example) into points as described above, the card issuer may then apply additional incentives through its own point system thereby creating an enhanced points program.

It should be understood that the card issuer may permit their operator of the loyalty system (or the merchants themselves) for access to BIN ranges of cardholders. The charges may depend on the efforts expended by the card issuer to encourage cardholders to enroll in the loyalty program. Or, the card issuer may elect to charge differing amounts for loyalty system access depending on the demographics of particular cardholders.

A card issuer may increase its revenue by offering incentives to consumers to use a particular financial card with a greater number of merchants. Merchants associated with the loyalty system provide incremental incentives to cardholders in certain BIN ranges. This way the card issuer and the loyalty system may cooperate to bring more business to the common group.

In a specific implementation of the present invention, the card issuers may elect to charge the cardholders an annual fee to carry a financial card that may be associated with a particular BIN range, and thereby also eligible for certain richer benefits in connection with a loyalty program. The additional annual fees represent an important source of additional revenue to the card issuer.

As previously stated, a merchant belonging to the loyalty system may choose to offer rewards/incentives based upon time of day and date. The merchant's merchant acquirer provides selected information relating to particular BIN ranges, transactions, dates and times. The loyalty system may identify the merchant, the time of day and the date and may apply differential incentives either through the loyalty system or in the form of differential points transferred by to the card issuer for the cardholder.

The merchant through the loyalty system may contract with the merchant acquirer for anticipated additional transactions from a particular set of BIN numbers. The merchant acquirer may be rewarded for the service in the form of a transaction fee or monthly fee through the loyalty system. The merchant may pay a differential rate for access to a particular BIN as the cardholders to a particular BIN may offer a greater opportunity for transactions.

A merchant acquirer may realize additional revenues due to differing transaction fees associated with differing BIN number acceptance as a form of payment by a participating merchant. The merchant acquirer may elect to charge differing transaction fees for acceptance of cards within certain BIN range of a participating card issuer.

It should be understood that one of the advantages of the present invention is that the described loyalty system and method may provide an opportunity for merchants, and for card issuers if they are willing, to efficiently operate and maintain their own loyalty program that provides the ability to share customers through cross-promotion between card issuers and merchants, and also cross-promotion between merchants involving cardholders who become members. The present invention may enable card issuers and merchants to obtain direct customer feedback and to perceive measured results regarding customer transactions at each merchant, including bases on analysis of BIN number ranges by operation of the loyalty system of the present invention.

In another aspect of the present invention, the card issuers may be provided with an economic interest to motivate the cardholders to become members of the loyalty system and to transact with merchants in order for the cardholders who are members to obtain benefits from the merchants (or from the card issuer based on an arrangement with the merchants). Again, customers of a co-branded card for example may be identified within the loyalty system by means of their financial card BIN range number through the registration process, thereby enabling subsequent transactions involving particular cardholders and particular merchants to be tracked, and measured results to be proven to card issuers and merchants alike.

It should be understood that benefits in accordance with the present invention may be accrued on behalf of members (including members who are cardholders) in a number of ways. The benefits themselves may vary. In a particular aspect of the present invention, pre-set benefit application or payment rates are associated with particular transactions associated with the loyalty system, as described in the Co-Pending Patent Application.

It should also be understood that within the loyalty system, merchants are motivated to develop new and innovative loyalty programs that will automatically be accessible to cardholders in accordance with the present invention. This saves the card issuer the time and resources generally required to devise new loyalty programs and enter into associated arrangements with their partners, often separately for each program.

Accordingly, the present invention may be understood as a means of generating financial transactions and/or customers for financial institutions or merchants, or both.

It should also be understood that the loyalty system may provide flexibility in the arrangements made by the merchants, or in fact in some bases between the merchants and the card issuers, as it relates to the benefits provided to cardholders who become members. These arrangements may define the pre-determined benefits associated with particular transactions, e.g. a per transaction benefit to the cardholder or in fact to the card issuer. As such, the present invention provides a potential source of new revenue for the card issuer to the extent that not all of the benefits earmarked for cardholders' transactions is actually passed on to the cardholders.

It should be understood that it is open to the card issuer to also provide benefits to cardholders in connection with transactions associated with the loyalty system. For example, card issuers may want to enhance benefits available from merchants in connection with specific transactions with benefits that they are themselves providing because for example the impact of client retention of a preferred customer who is a golfer might be enhanced if a benefit from the card issuer is provided specifically in connection with a transaction that brings happiness to the golfer, i.e. golf. Alternatively, the card issuer could "top up" benefits provided by merchants, thereby enhancing the merchant's relationship with the cardholder who is a member, if the merchant is a customer of the card issuer or a related entity of the card issuer. Consequently, the loyalty system, at little or no additional cost, can be used as a means of generating additional new business for the card issuer.

In a particular aspect of the present invention, the loyalty system may effectively permit some merchants who would otherwise not be able to enter into co-branded card type arrangements (e.g. because of start up costs or because of the merchant is a regional retailer where the merchant might not otherwise be attractive to a large financial institution). Accordingly, the present invention may allows regional merchants to compete better against national chains.

This invention, in one particular aspect thereof, provides a loyalty program with a relatively low cost way to acquire customers and pay for them over future transactions. It also provides the co-branded partner the ability to expand transactions on the current card base, both from the initial referrals and subsequent transactions resulting from cross promotional offers within the loyalty system among other merchants.

By operation of the present invention, a financial card may be moved to the front of the wallet to be used for more transactions.

In another particular aspect of the present invention, cardholders of selected co-branded financial cards may become members where the co-branded partners' service or product is not really competitive with the loyalty system merchants. Accordingly, use of co-branded cards in connection with the described loyalty system protects transaction market share for both the card issuer and co-branded partners' market share.

The card issuer, the co-branded partner and the merchants of the loyalty program may increase their customer transactions through sharing customers.

It should be evident from the above that the flexibility that may be provided to card issuers and merchants to devise, implement, and then measure the effectiveness of, various cross-promotional initiatives, can dramatically increase the returns on investment of card issuers and merchants alike, in connection with their customer retention and customer acquisition activities.

Other implementations and extensions of the invention are possible. For example, it should be understood that the present invention contemplates use of various security methods and technologies for restricting access to resources of the loyalty system to those authorized to do so by the operator of the loyalty system; the use of various existing and future technologies to process payments by operation of the transaction utility (38); various tools and interfaces for interacting with the loyalty system in accordance with the method of the present invention. The system also allows for robust reporting which may include comparative reports of member affinity or of transaction history with participating merchants. In other words, member transaction history may be different for differing groups of members based on member affinity.

What is claimed is:

1. A loyalty system for enabling a loyalty program to be operable via the Internet to engage in real time data communications with one of more card issuers respectively issuing accounts to account holders and one or more merchant acquirers respectively issuing accounts to merchant, the loyalty program being linked to the one or more card issuers, and thereby their account holders, by operation of the loyalty system, the loyalty system being operable to enable the creation, implementation and management of one or more loyalty programs that provide benefits to members of the loyalty programs in connection with transactions between the members and one or more merchants associated with the loyalty system, the loyalty system comprising:

means for registering on the loyalty system one or more card issuers of a card issuer system;

means for registering on the loyalty system one or more merchant acquirers of a merchant acquirer system associated with the one or more card issuers;

means for registering a plurality of the account holders as members of the loyalty program;

means for the operator of the loyalty system, the one or more card issuers, and the merchants establishing rules for accrual and processing of benefits from the merchants to account holders associated with the one or more card issuers in connection with transactions between the account holders and the merchants with the loyalty system;

for each said transaction between one said account holder and one said merchant transaction, means for receiving acknowledgement of:

an authorization request for the transaction sent from the merchant acquirer corresponding to the merchant to the card issuer corresponding the account holder; and an authorization response to authorization request sent from the card issuer corresponding to the account holder to the merchant acquirer corresponding to the merchant;

and for each said transaction for which the authorization response includes an indicator that the transaction has been authorized by the card issuer corresponding to the account holder:

means for applying the rules to accrue and process the benefits of account holders in connection with the transactions between the account holders and the merchants, by operation of the loyalty system; and means for defining a survey utility capable to issue surveys to members of the loyalty system, wherein said means for defining the survey utility includes:

means for receiving, from at least one of the card issuer system and the merchant acquirer system, transaction data associated with an electronically-processed transaction conducted on an account of one said account holder to whom the account was issued by one said card issuer, wherein the one said account holder and the one said card issuer are registered with the loyalty program, and the transaction is between the one said account holder and one said merchant registered with the loyalty program, the transaction data including a account holder identifier;

means for determining whether the transaction triggers a survey based on the data and a set of survey triggering criteria; and when the transaction triggers the survey, means for generating signals for communicating the survey to the one said account holder;

and means for paying the benefits to the card issuers so that the card issuers may optionally retain a portion of the benefits, whereby an additional source of revenue is provided to the card issuers.

2. The loyalty system as defined in claim 1 further comprising means for generating signals for triggering the accrual of at least one benefit to the account holder based on completion of the survey.

3. The loyalty system as defined in claim 1, wherein at least one benefit is accrued to the card issuer from the merchant based on the transaction data.

4. The loyalty system as defined in claim 1, wherein the means for determining that the transaction triggers the survey is based on at least one survey triggering criterion defined by at least one of the merchant, a corporate sponsor or a financial institution.

5. The loyalty system as defined in claim 4, further comprising means for receiving signals for creating or modifying at least one survey triggering criterion defined by the merchant.

6. The loyalty system as defined in claim 4, wherein at least one of the survey triggering criteria are defines based on at least one of a date range of the transaction, a transaction amount, or a financial card BIN number.

7. The loyalty system as defined in claim 4, comprising means for identifying a account holder account in a database based on the transaction data account holder identifier; and wherein at least one of the survey triggering criteria is based on at least one of: a account holder demographic, a geographic region of the card holder, or a transaction history of the account holder.

8. The loyalty system as defined in claim 4 wherein at least one of the survey triggering criteria is based on a time since a previous survey completion, an indication that the account holder has never transacted with the merchant, or an indication that the account holder has transacted with other merchants in a same category as the transacting merchant.

9. An Internet server hardware system comprising:
means for executing software for enabling a loyalty program to be operable via the Internet to engage in real time data communications with one of more card issuers respectively issuing accounts to account holders and one or more merchant acquirers respectively issuing accounts to merchant, the method further enabling the loyalty program to be linked to the one or more card issuers, and thereby their account holders, by operation of a loyalty system, the loyalty system being operable to enable the creation, implementation and management of one or more loyalty programs that provide benefits to members of the loyalty programs in connection with transactions between the members and one or more merchants associated with the loyalty system, the loyalty system including:
means for registering on the loyalty system one or more card issuers of a card issuer system;
means for registering on the loyalty system one or more merchant acquirers of a merchant acquirer system associated with the one or more care issuers;
means for registering a plurality of the account holders as members of the loyalty program;
the operator of the loyalty system, the one or more card issuers, and the merchants establishing rules for accrual and processing of benefits from the merchants to account holders associated with the one or more card issuers in connection with transactions between the account holders and the merchants with the loyalty system;
for each said transaction between one said account holder and one said merchant transaction, means for receiving acknowledgement of:
an authorization request for the transaction sent from the merchant acquirer corresponding to the merchant to the card issuer corresponding the account holder; and
an authorization response to authorization request sent from the card issuer corresponding to the account holder to the merchant acquirer corresponding to the merchant; and
for each said transaction for which the authorization response includes an indicator that the transaction has been authorized by the card issuer corresponding to the account holder, the loyalty system including:
means for applying the rules to accrue and process the benefits of account holders in connection with the transactions between the account holders and the merchants, by operation of the loyalty system; and
means for defining a survey utility capable to issue surveys to members of the loyalty system, wherein the means for defined the survey utility includes:
means for receiving, from at least one of the card issuer system and the merchant acquirer system, transaction data associated with an electronically-processed transaction conducted on an account of one said account holder to whom the account was issued by one said card issuer, wherein the one said account holder and the one said card issuer are registered with the loyalty program, and the transaction is between the one said account holder and one said merchant registered with the loyalty program, the transaction data including a account holder identifier;
means for determining whether the transaction triggers a survey based on the data and a set of survey triggering criteria; and
when the transaction triggers the survey, means for generating signals for communicating the survey to the one said account holder; and
means for paying the benefits to the card issuers so that the card issuers may optionally retain a portion of the benefits, whereby an additional source of revenue is provided to the card issuers.

10. The Internet server hardware system as defined in claim 9, wherein the means for executing software configures the Internet server hardware system for: generating signals for triggering accrual of at least one benefit to the account holder based on completion of the survey.

11. The Internet server hardware system as defined in claim 9, wherein at least one benefit is accrued to the card issuer from the merchant based on the transaction data.

12. The Internet server hardware system as defined in claim 9, wherein determining that the transaction triggers the survey is based on at least one survey triggering criterion defined by at least one of the merchant, a corporate sponsor or a financial institution.

13. The Internet server hardware system as defined in claim 12, wherein the means for executing software configures the Internet server hardware system for receiving signals for creating or modifying at least one survey triggering criterion defined by the merchant.

14. The Internet server hardware system as defined in claim 12, wherein at least one of the survey triggering criteria are defined based on at least one of a date range of the transaction, a transaction amount, or a financial card BIN number.

15. The Internet server hardware system as defined in claim 12, wherein the means for executing software configures the Internet server hardware system for identifying a account holder account in a database based on the transaction data account holder identifier; and wherein at least one of the survey triggering criteria is based on at least one of: a account holder demographic, a geographic region of the card holder, or a transaction history of the account holder.

16. The Internet server hardware system as defined in claim 12, wherein at least one of the survey triggering criteria is based on a time since a previous survey completion, an indication that the account holder has never transacted with the merchant, or an indication that the account holder has transacted with other merchants in a same category as the transacting merchant.

17. A non-transitory computer-readable medium or media having stored thereon computer-readable instructions for configuring an Internet server hardware system to execute the computer-readable instructions to perform a method for enabling operation of a loyalty system, the loyalty system being operable to enable the creation, implementation and management of one or more loyalty programs that provide benefits to account holders that are members of the loyalty programs in connection with transactions between the account holders and one or more merchants associated with the loyalty system, characterized in that the method comprises the steps of:

registering on the loyalty system one or more card issuers of a card issuer system;

registering on the loyalty system one or more merchant acquirers of a merchant acquirer system associated with the one or more care issuers;

registering a plurality of the account holders as members of the loyalty program;

the operator of the loyalty system, the one or more card issuers, and the merchants establishing rules for accrual and processing of benefits from the merchants to account holders associated with the one or more card issuers in connection with transactions between the account holders and the merchants with the loyalty system;

for each said transaction between one said account holder and one said merchant transaction for which there has been received an acknowledgement that the transaction has been authorized by the card issuer corresponding to the account holder:

applying the rules to accrue and process the benefits of account holders in connection with the transactions between the account holders and the merchants, by operation of the loyalty system; and defining a survey utility capable to issue surveys to members of the loyalty system, wherein the defined survey utility includes the steps of:

receiving, from at least one of the card issuer system and the merchant acquirer system, transaction data associated with an electronically-processed transaction conducted on an account of one said account holder to whom the account was issued by one said card issuer, wherein the one said account holder and the one said card issuer are registered with the loyalty program, and the transaction is between the one said account holder and one said merchant registered with the loyalty program, the transaction data including a account holder identifier;

determining whether the transaction triggers a survey based on the data and a set of survey triggering criteria; and when the transaction triggers the survey, generating signals for communicating the survey to the one said account holder;

and paying the benefits to the card issuers so that the card issuers may optionally retain a portion of the benefits, whereby an additional source of revenue is provided to the card issuers.

18. The medium or media as defined in claim 17, wherein the computer-readable instructions include instructions for configuring the Internet server hardware system for: generating signals for triggering the accrual of at least one benefit to the account holder based on completion of the survey.

19. The medium or media as defined in claim 17, wherein at least one benefit is accrued to the card issuer from the merchant based on the transaction data.

20. The medium or media as defined in claim 17, wherein determining that the transaction triggers the survey is based on at least one survey triggering criterion defined by at least one of the merchant, a corporate sponsor or a financial institution.

* * * * *